United States Patent [19]
Gorshtein et al.

[11] Patent Number: 5,923,871
[45] Date of Patent: Jul. 13, 1999

[54] MULTIFUNCTIONAL EXECUTION UNIT HAVING INDEPENDENTLY OPERABLE ADDER AND MULTIPLIER

[75] Inventors: Valery Y. Gorshtein; Olga A. Efremova, both of Moscow, Russian Federation

[73] Assignee: Elbrus International, George Town, Cayman Islands

[21] Appl. No.: 08/733,834

[22] Filed: Oct. 18, 1996

Related U.S. Application Data

[63] Continuation of application No. PCT/RU96/00214, Aug. 7, 1996.

[51] Int. Cl.[6] .................................................. G06F 15/00
[52] U.S. Cl. ............................................................ 395/562
[58] Field of Search ........................ 364/DIG. 1 MS File, 364/DIG. 2 MS File; 395/800.01, 800.09, 800.24, 800.23, 800.33, 376, 561, 562, 563, 564

[56] References Cited

U.S. PATENT DOCUMENTS 5,187,796  2/1993  Wang et al. ............................. 395/800

*Primary Examiner*—Robert B. Harrell
*Attorney, Agent, or Firm*—Pennie & Edmonds LLP

[57] ABSTRACT

Floating point performance in a VLIW processor is increased through concatenation of two floating point units, one an adder and another a multiplier, which execute independently of one another but which operate in cooperation for certain combinations of issued operations. In particular, the floating point adder and the floating point multiplier may be activated individually by very long instruction words, which are also called wide instructions, that issue operations to either unit or both units at one time. For other wide instructions, both the floating point adder and the floating point multiplier may be sequentially activated by a single instruction with three operands. The first two operands are used by one of the units, either the floating point adder or the floating point multiplier, and the unit is activated. The result generated by the activated unit and the third operand are applied as operands for usage by one of the units, again either the floating point adder or the floating point multiplier, and the unit is activated. In this manner, a single instruction activates the floating point multiplier and the floating point adder in combination for execution of two operations. Each of the floating point adder and the floating point multiplier execute once or either executes twice by the issue of a single instruction.

22 Claims, 15 Drawing Sheets

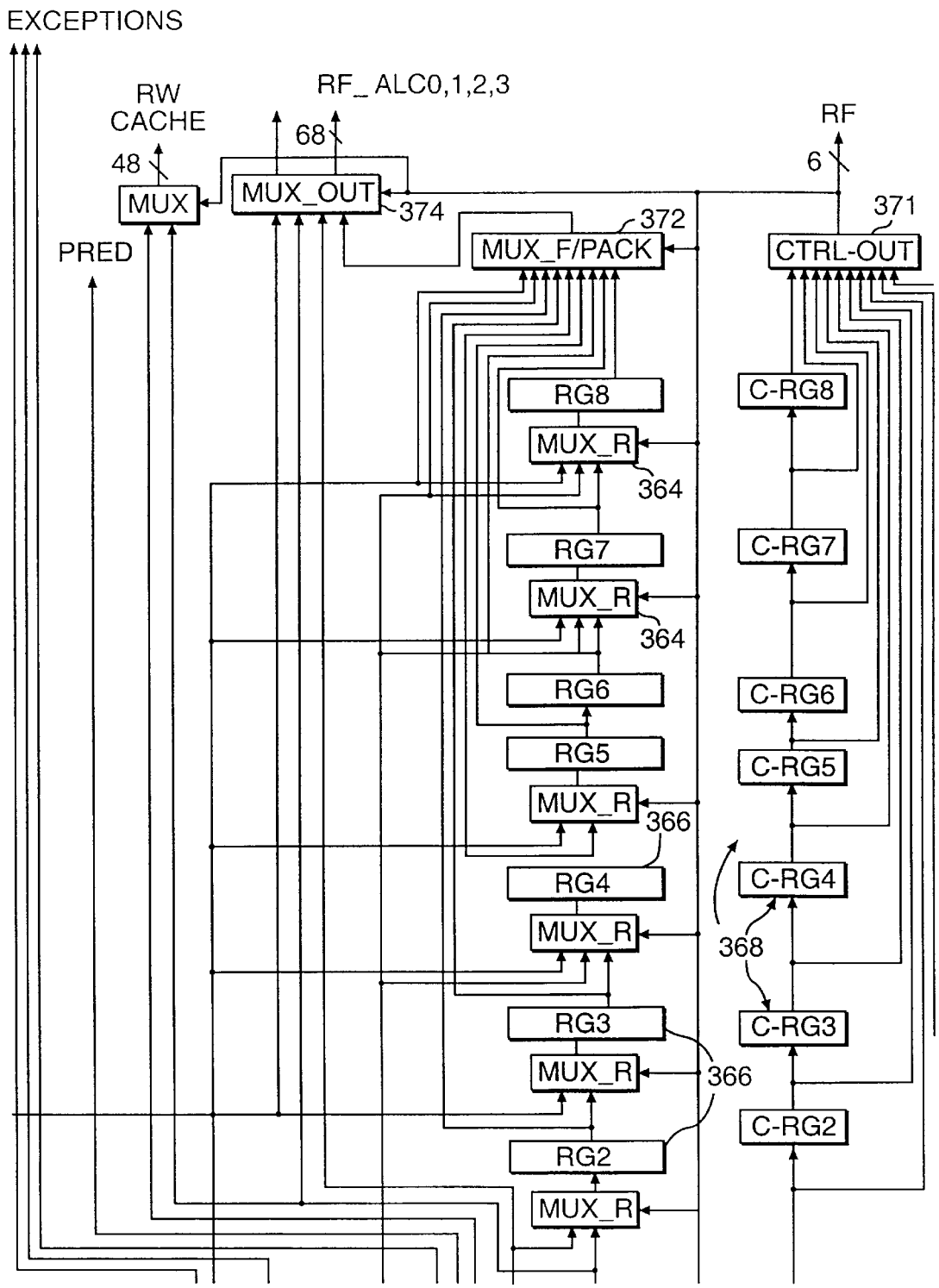
FIG. 3B.1

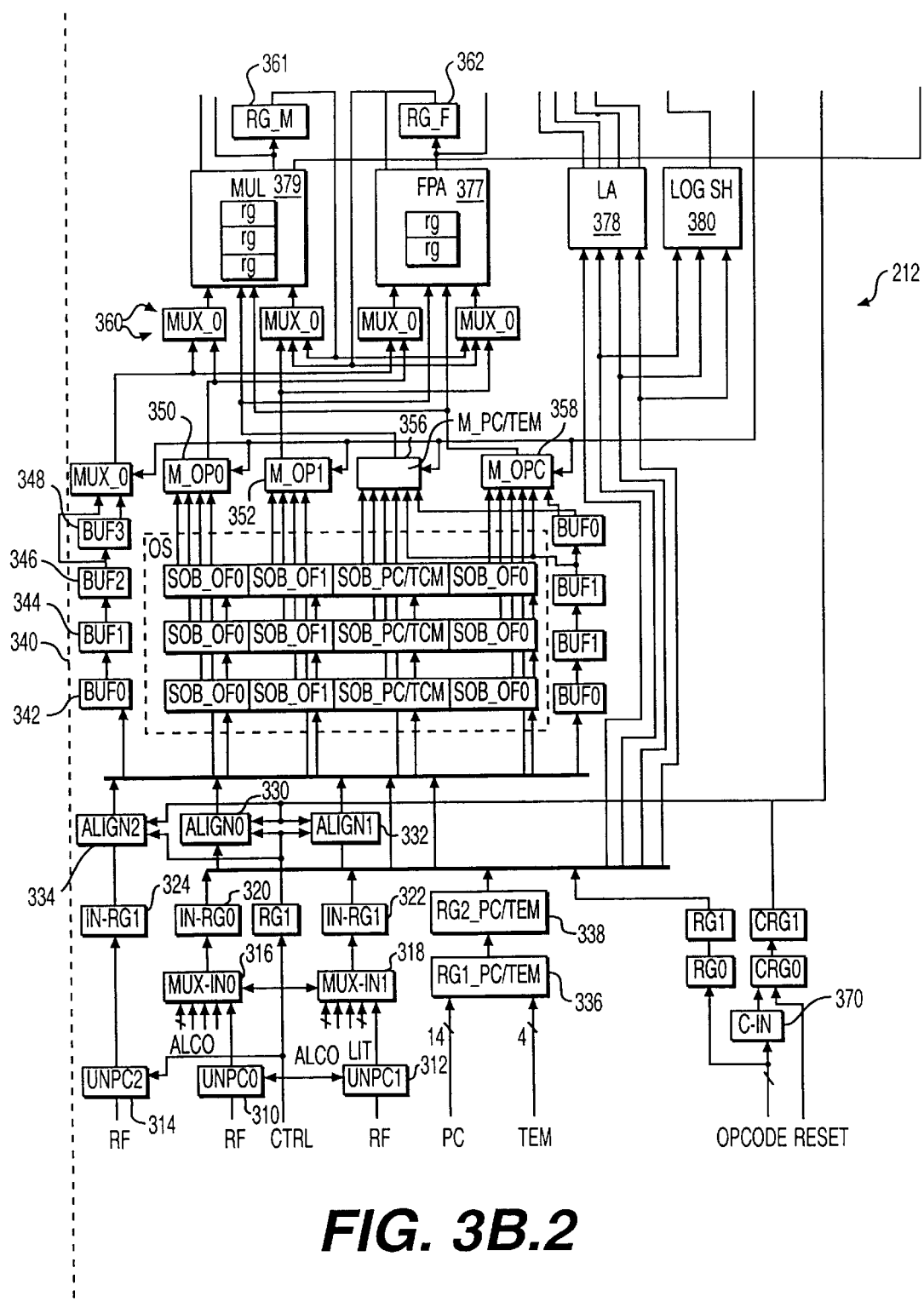
*FIG. 3B.2*

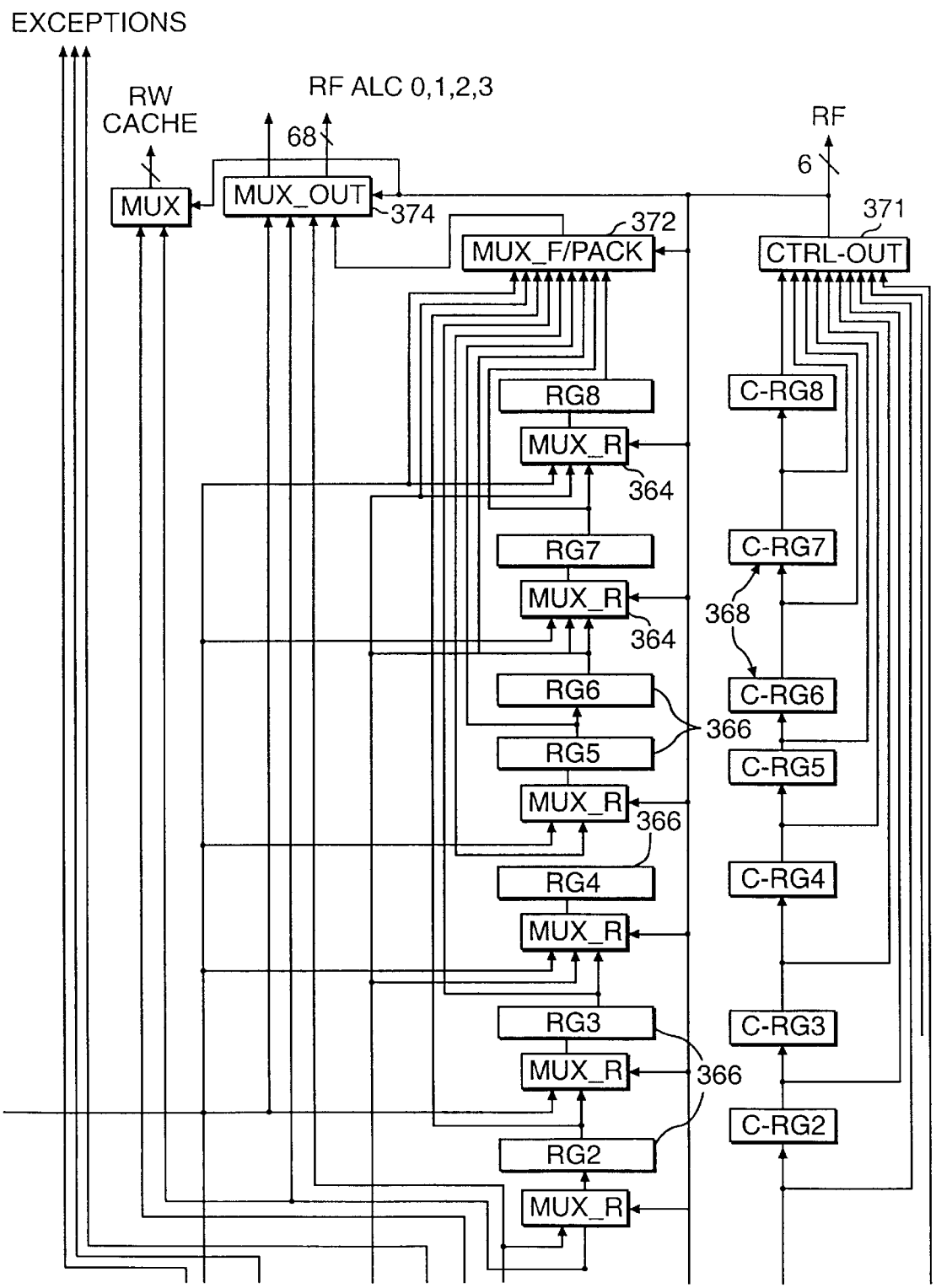
FIG. 3D.1

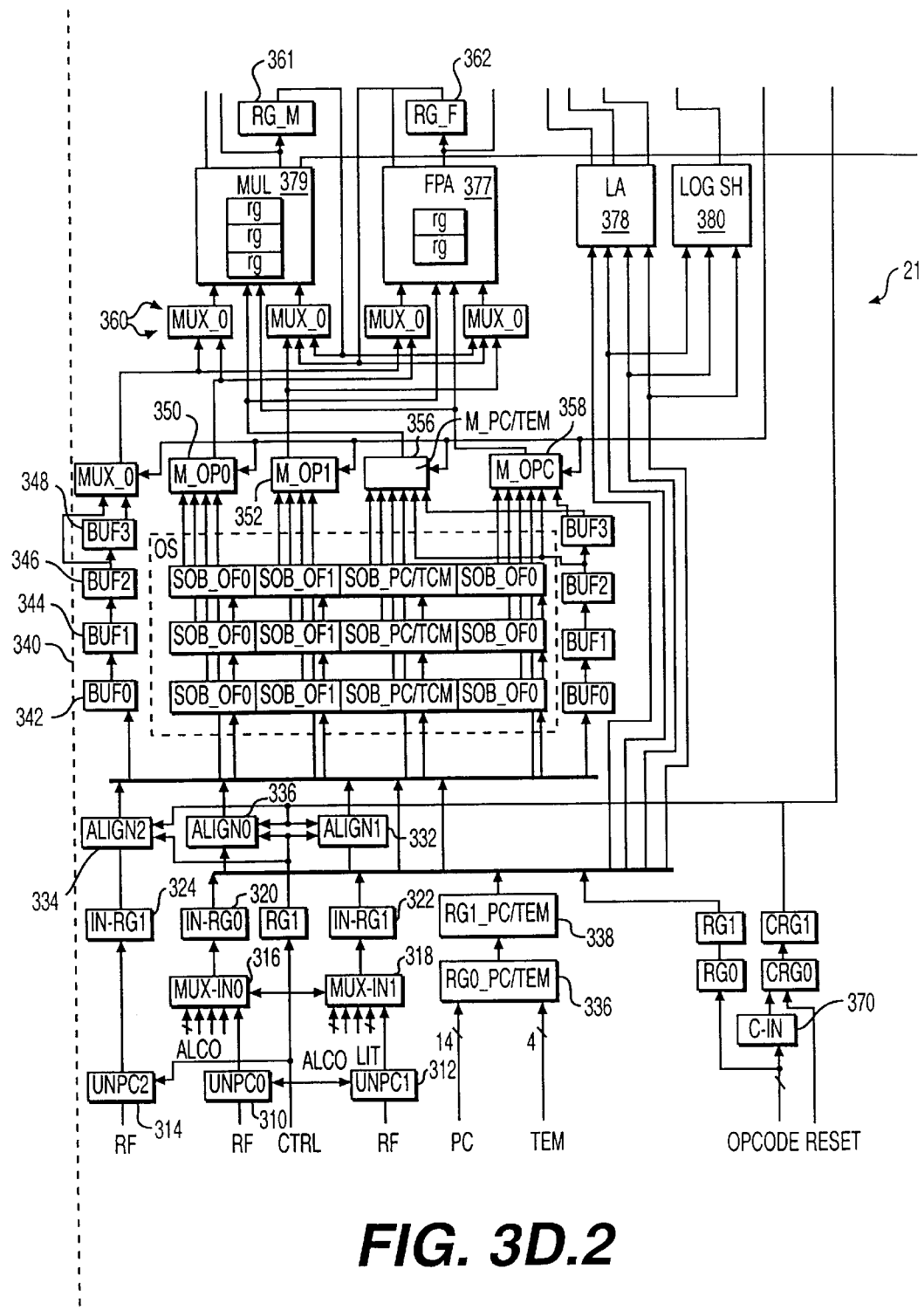
FIG. 3D.2

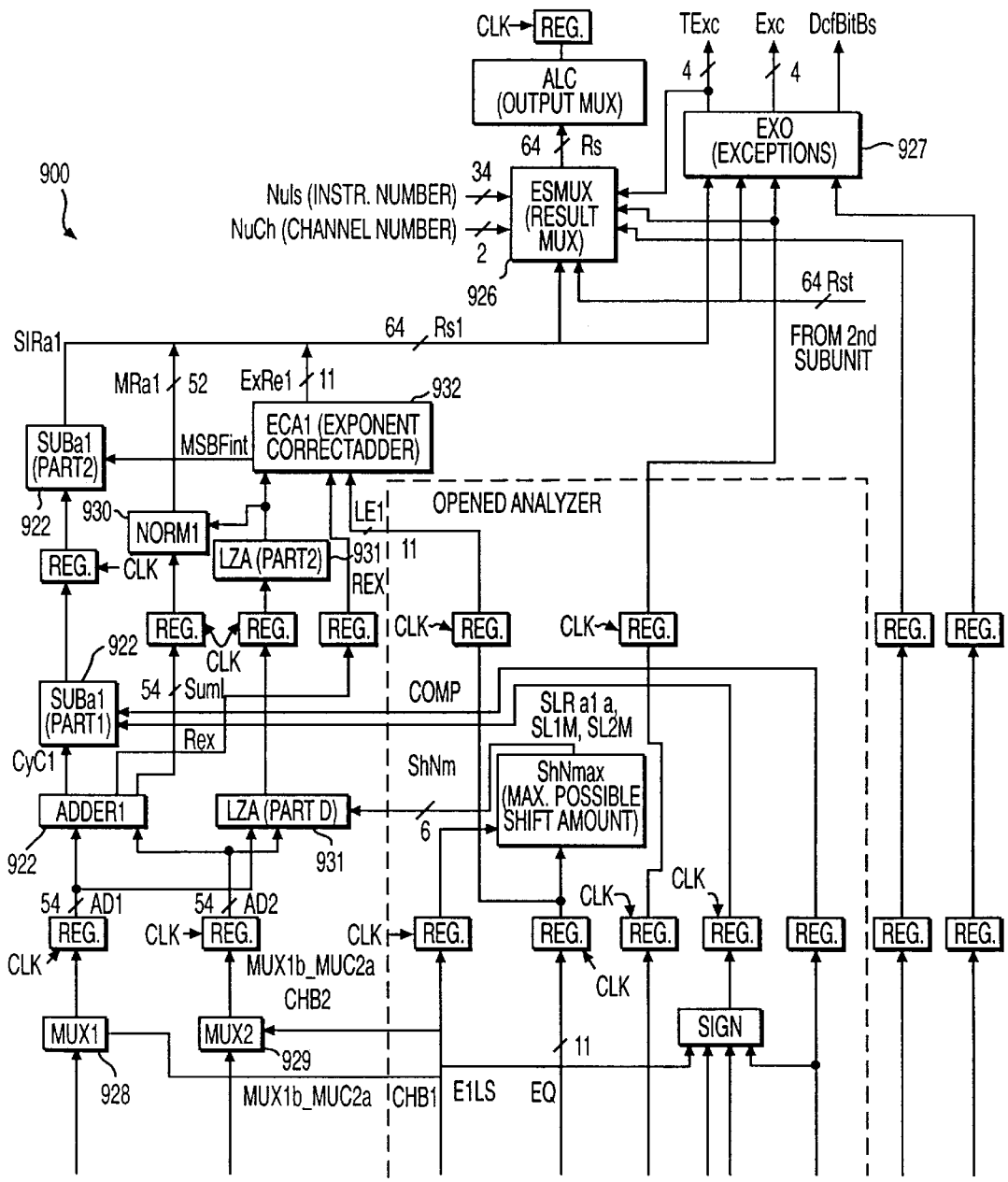
FIG. 9A.1

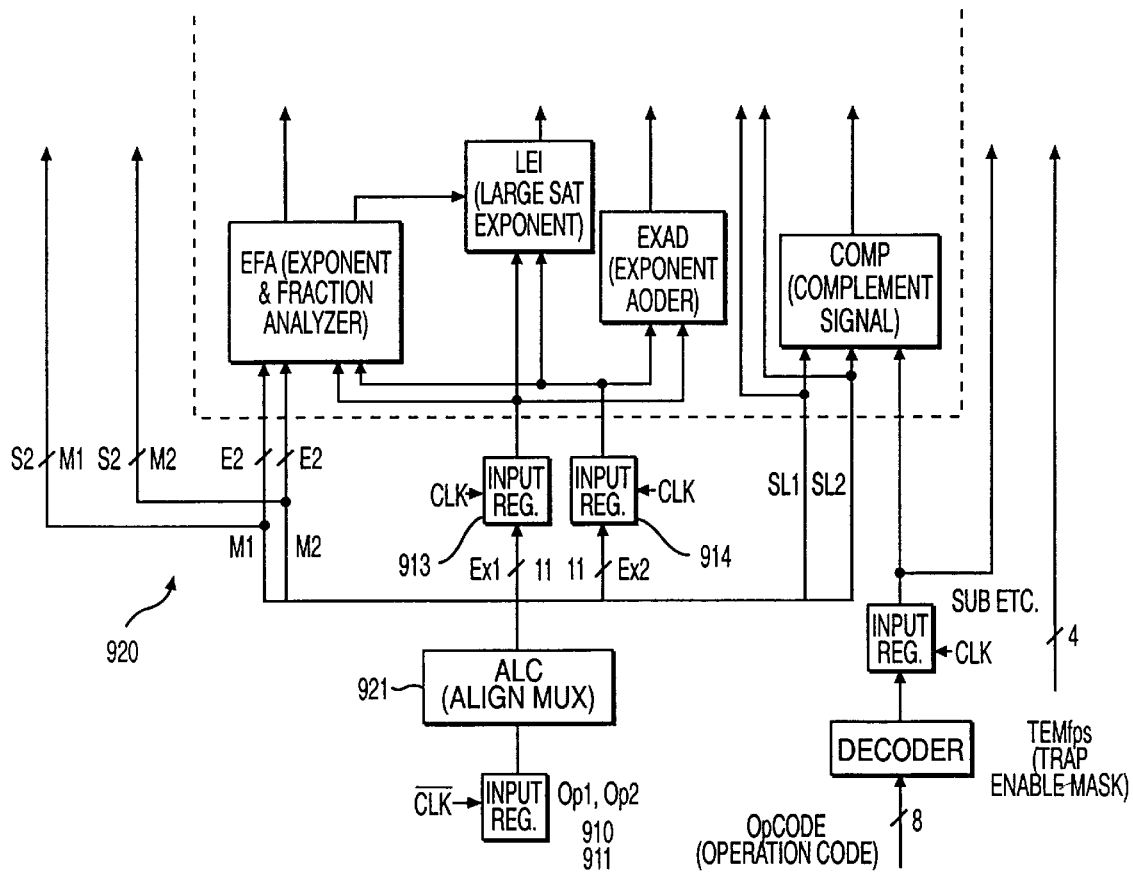
FIG. 9A.2

MULTIFUNCTIONAL EXECUTION UNIT HAVING INDEPENDENTLY OPERABLE ADDER AND MULTIPLIER

The present application is a continuation of a PCT international application designating the United States of America (Ser. No. PCT/RU96/00214) filed Aug. 7, 1996, naming Gorshtein et al. as inventors and entitled "MULTIFUNCTIONAL EXECUTION UNIT".

CROSS-REFERENCE

The present invention is related to subject matter disclosed in the following co-pending patent applications:

1. U.S. patent application entitled "Apparatus and Methods for Execution of Computer Instructions", Ser. No. XX/xxx,xxx<atty. docket no.: M-3492 US>, and the corresponding PCT international application designating the United States of America (Ser. No. PCT/RU96/00210);
2. U.S. patent application entitled "Disambiguation Memory Circuit and Operating Method", Ser. No. XX/xxx,xxx<atty. docket no.: M-3728 US>, naming Babaian et al. as inventors and filed on even date herewith, and the corresponding PCT international application designating the United States of America (Ser. No. PCT/RU96/00215);
3. U.S. patent application entitled, "Architectural Support for Software Pipelining of Loops", Ser. No. XX/xxx,xxx<atty. docket no.: M-3730 US>, naming Babaian et al. as inventors and filed on even date herewith, and the corresponding PCT international application designating the United States of America (Ser. No. PCT/RU96/00213);
4. U.S. patent application entitled "Array Prefetch Algorithm," Ser. No. XX/xxx,xxx<atty. docket no.: M-3793 US>, naming Babaian et al. as inventors and filed on even date herewith, and the corresponding PCT international application designating the United States of America (Ser. No. PCT/RU96/00217);
5. U.S. patent application entitled, "Architectural Support for Software Pipelining of Nested Loops," Ser. No. XX/xxx,xxx<atty. docket no.: M-3794 US>, naming Babaian et al. as inventors and filed on even date herewith, and the corresponding PCT international application designating the United States of America (Ser. No. PCT/RU96/00216); and
6. U.S. patent application entitled, "Wide Instruction Unpack," Ser. No. XX/xxx,xxx<atty. docket no.: M-3795 US>, naming Sakhin et al. as inventors and filed on even date herewith, and the corresponding PCT international application designating the United States of America (Ser. No. PCT/RU96/00218);

each of which is incorporated herein by reference, in its entirety.

BACKGROUND OF THE INVENTION

1. Field of the Invention

The present invention relates to processors and computing devices. More specifically the present invention relates to a multiple function floating point arithmetic execution unit in a processor.

2. Description of the Related Art

Very Long Instruction Word (VLIW) processor architectures achieve efficient performance by exploiting instruction level parallelism in which a compiler performs most instruction scheduling and parallel dispatching at compile-time, reducing the operating burden at run-time. By moving scheduling tasks to the compiler, a VLIW processor avoids both the operating latency and the large and complex circuitry associated with on-chip instruction scheduling logic.

Each VLIW instruction includes multiple independent operations for execution by the processor in a single cycle. A VLIW compiler forms these instructions according to precise conformance to the structure of the processor, including the number and type of execution units, as well as execution unit timing and latencies. The compiler groups the operations into a wide instruction for execution in one cycle. At run-time, the wide instruction is applied to the various execution units with little decoding. Execution units which are idle in a particular cycle are issued a no-operation (NOP) signal.

The execution units in a VLIW processor typically include arithmetic units such as floating point arithmetic units. One example of a VLIW processor that includes floating point execution units is described by R. K. Montoye, et al. in "Design of the IBM RISC System/6000 floating point execution unit", IBM J.Res.Develop., V. 34, No. 1, pp. 61–62, January 1990. The Montoye system floating point unit is a multiply-add fused (MAF) dataflow processor unit. The MAF unit performs a double-precision multiply operation in a single cycle and a double-precision add operation in the following cycle. The MAF architecture supports the exploitation of the multiply-add capability through a set of "multiply-add" instructions.

A second example of a VLIW processor including a floating point execution unit is described by Hicks, T. N. et al, in "POWER2 Floating-Point Unit: Architecture and Implementation", PowerPC and POWER2: Technical Aspects of the new IBM RISC System/6000, IBM Corporation, SA23—2737, pp.45–54, 1994. The Power2 floating point unit achieves a megaflop execution rate by integrating dual generic MAF ALUs, doubling the instruction bandwidth and quadrupling the data bandwidth over the POWER FPU bandwidth. The Power2 floating point unit includes support for additional functions using dynamic instruction scheduling techniques.

What is needed is a VLIW arithmetic processor which further improves floating point performance.

SUMMARY OF THE INVENTION

In accordance with the present invention, floating point performance in a VLIW processor is increased through concatenation of two floating point units, one an adder and another a multiplier, which execute independently of one another but which operate in cooperation for certain combinations of issued operations. In particular, the floating point adder and the floating point multiplier may be activated individually by very long instruction words, which are also called wide instructions, that issue operations to either unit or both units at one time. For other wide instructions, both the floating point adder and the floating point multiplier may be sequentially activated by a single instruction with three operands. The first two operands are used by one of the units, either the floating point adder or the floating point multiplier, and the unit is activated. The result generated by the activated unit and the third operand are applied as operands for usage by one of the units, again either the floating point adder or the floating point multiplier, and the unit is activated. In this manner, a single instruction activates the floating point multiplier and the floating point adder in combination for execution of two operations. Each of the floating point adder and the floating point multiplier execute once or either executes twice by the issue of a single instruction.

Several advantages are achieved using the disclosed floating point execution units. One advantage is that the number of combined operations is increased beyond the multiply-add operations of conventional systems to include floating point multiply-multiply, add-multiply and add-add combined operations. A further advantage is that floating point execution units are used more efficiently since both units can be controlled to execute different operations in parallel. Still another advantage is that parallel execution is increased. Further advantageously, the described processor generates a result which fully conforms to the IEEE 754 floating point standard.

BRIEF DESCRIPTION OF THE DRAWINGS

The features of the invention believed to be novel are specifically set forth in the appended claims. However, the invention itself, both as to its structure and method of operation, may best be understood by referring to the following description and accompanying drawings.

FIGS. 3A, 3B, 3C, and 3D, illustrate a structure of arithmetic and logic channels ALU0, ALU1, ALU2, and ALU3 is shown.

FIGS. 9A and 9B, in combination, form a schematic block diagram which depicts a floating point addition unit for usage in the ALU channels shown in FIGS. 3A through 3D.

DETAILED DESCRIPTION OF THE PREFERRED EMBODIMENTS

Figure 1:
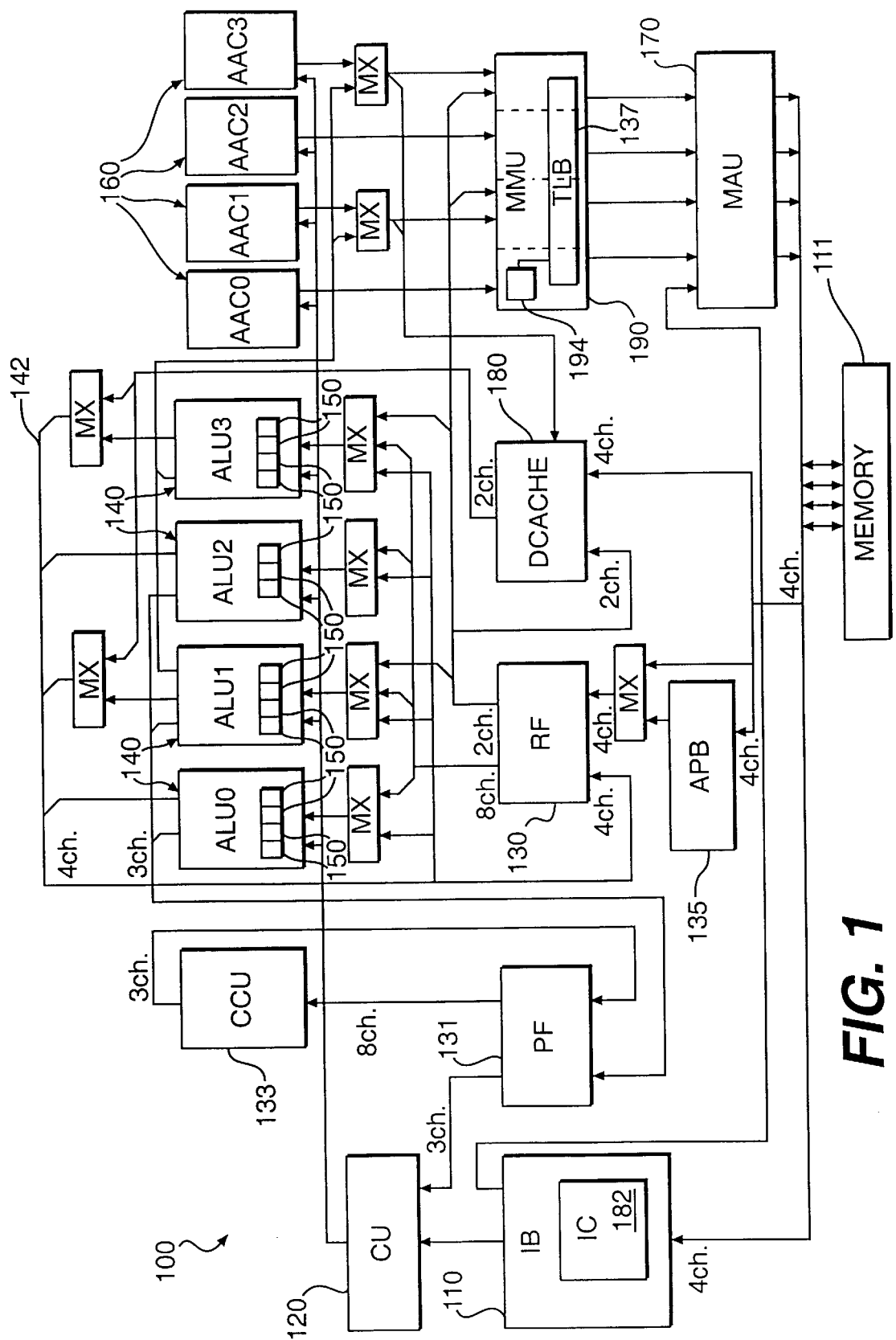
FIG. 1 is a schematic block diagram which illustrates a central processing unit (CPU) which includes a floating point execution unit in accordance with an embodiment of the present invention.

Referring to FIG. 1, a Central Processor Unit (CPU) 100 has a wide instruction word architecture and uses Instruction Level Parallelism (ILP) to ensure high performance. The CPU compiler is used to plan the operations to be executed by the CPU 100 in each cycle. The processor structure allows concurrent execution of a few simple independent instructions (operations) that constitute a wide instruction (load, store, add, multiply, divide, shift, logical, branch, etc.). Wide instructions are stored in a memory 111 connected to the CPU 100 in packed form as sets of 16 and 32 bits syllables. Particular operations can occupy a part of syllable, a whole syllable or several syllables. The EU 150 operation execution time is one cycle for integer and logic operations, two cycles for floating point addition, three or four cycles for floating point multiplication, seven cycles for word format division and ten to eleven cycles for two-word format, normalized operands. All operations except division may be run in every cycle. Division may be run every other cycle.

The Central Processor Unit 100 contains an Instruction Buffer (IB) 110, a Control Unit (CU) 120, a multiport Predicate File (PF) 131, a multiport Register File (RF) 130, a Calculate Condition Unit (CCU) 133, a Data Cache (DCACHE) 180, four Arithmetic Logic Units (ALU0–ALU3) generally identified as 140, each of which includes a plurality of execution units (EUs) which are shown generally as EU 150, an Array Prefetch Buffer (APB) 135, four Array Access Channels (AAC0–AAC3) generally identified as 160, a Memory Management Unit (MU) 190, and Memory Access Unit (AU) 170. The combination of wide instruction operation and a large number of execution units 150 allows several alternative program branches to execute concurrently in a speculative mode.

The Instruction Buffer (IB) 110 contains 2048 64-bit words and is divided into sixteen sectors. Program code is stored in virtual memory (not shown) which is common with data code storage. IB 110 has a separate Instruction Translate Lookaside Buffer (ITLB) 117 with 32 entries. IB 110 filling is initiated by hardware for direct way when direct way code is exhausted in IB 110 and by a program when prepare control transfer operation is executed. IB 110 performs program code filling for three branches. In the case of IB 110 miss, the program code is loaded from memory 111 by four memory access channels in parallel (four 64-bit words simultaneously). IB 110 and Control Unit (CU) 120 perform reading from IB 110 and dispatching of the maximum size wide instruction (eight 64-bit words) every cycle.

The control unit (CU) 120 generates wide instructions in an unpacked form, transforms indirect based operands addresses of wide instruction to absolute addresses in a register file 130, checks the conditions of the wide instruction issue. The wide instruction issue conditions which are checked include checking for no exceptions, no interlock conditions from other units of CPU 100, and availability of operands in the register file (RF) 130.

The Control Unit (CU) 120 issues wide instruction operations for execution and performs several tasks including reading of up to ten operands from the register file (RF) 130 to ALU0–ALU3 140, reading up to three predicate values from the Predicate File (PF) 131 to Control Unit (CU) 120 as condition code for control transfer operations, reading up to eight predicate values from the Predicate File (PF) 131 to the Calculate Condition Unit (CCU) 133 for calculation of new predicate values and generation of a mask of condition execution of operations in ALU0–ALU3 140 and AAC0–AAC3 160, issuing literal values to ALU0–ALU3 140 and AAC0–AAC3 160, issuing up to four operations to ALU0–ALU3 140, issuing up to four operations to AAC0–AAC3 160, and issuing up to four operations to the Calculate Condition Unit (CCU) 133. The Control Unit (CU) 120 also issues a prepare control transfer operation to Control Unit (CU) 120 and checks for the possibility of the execution of three control transfer operations in Control Unit (CU) 120. The control unit 120 receives an "H-syllable" of an instruction word, transforms operand addresses from the instruction that are base-relative into effective register file addresses, and checks conditions of the next instruction delivery from an unpacked instruction register (not shown) to an execution unit 150.

The Predicate File (PF) 131 is a storage of predicate values generated by integer and floating point compare operations. Predicate values are used to control the conditional execution of operations. The Predicate File (PF) 131 contains 32 two-bit registers.

The Calculate Condition Unit (CCU) 133 generates a mask for the conditional execution of ALUi 140 and AACi 160 operations and calculates values of the secondary predicate as the primary predicates function.

The Register File (RF) 130 contains 256 66-bit registers and has ten read ports and eight write ports. All ten read ports are used to read ALU 140 operands and two read ports are used to read stored values to the Data Cache (DCACHE) 180 and the Memory Management Unit (MMU) 190. Four write ports are used to write ALUs results and the other four write ports are used to write values loaded from memory. The register file 130 accesses the 256 66-bit registers using four address bases (CWP, CWPAR, BR1 and BR2). Each base addresses up to 64 registers.

ALU0–ALU3 140 are four parallel executive channels and have nearly the same sets of arithmetic and logic operations. ALU1 and ALU3 are used to calculate addresses of scalar memory accesses. All ALUs receive operands from register file (RF) 130 and bypass buses 142. The bypass abates the time of delivery of ALUs operations results to the following operations. ALU0 and ALU2 receive two operands and ALU1 and ALU3 receive three operands for execution of combined three-argument operations. ALU 140 operation results are written to the register file (RF) 130 through four RF write channels.

The Array Access Channels AAC0–AAC3 160 are four parallel channels for generation of array elements addresses for loops. Each AACi contains eight pair of address registers which are current address register and increment register. All AACi 160 have the same operations set including a current array element address generation operation with or without the next element address calculation. For memory accesses, one pair of address registers in each channel is used in every cycle. AAC0 and AAC2 are used only for load memory accesses. AAC1 and AAC3 are used for load and store memory accesses.

The Memory Management Unit (MU) 190 contains a four-port Data Translate Lookaside Buffer (DTLB) 137 with 64 entries and performs hardware search in Page Table in DTLB 137 miss case. The Memory Management Unit (MMU) 190 also contains a Disambiguation Memory 194 for checking rearrangement correctness of load and store operations, performed by an optimizing compiler.

Dynamic conflicts occur when a compiler moves a load instruction to precede a store instruction to common reading and writing addresses. The disambiguation memory 194 includes sixteen associative registers for detecting such memory conflicts. The virtual address is used as an associative tag. Invoking a load instruction causes the load address to be driven to the disambiguation memory 194 which checks for subsequent stores to the same address. The disambiguation memory 194 responds to a store at the address by generating a trap. The address is deleted from the disambiguation memory 194 using a CHECKDAM instruction.

The MAU 170 is an interface for communicating between the CPU 100 and external memory at an exchange rate of up to four information words transferred during a cycle. The Memory Access Unit contains an entry buffer for memory requests and a crossbar of four data and one group instruction buffer (IB) 110 memory access channels to four physical memory channels. Two least significant bits of physical addresses are the physical memory channel number.

The Data Cache (DCACHE) 180 caches data for scalar memory access. Data Cache (DCACHE) 180 is write-through, 32 Kbytes, four-way set associative with 64-byte blocks, virtually addressed and virtually tagged, dual-ported with 64-bit data paths. Data Cache (DCACHE) 180 output is united with ALUs output that permits to use bypass buses 142 to abate data transfer to ALUs. In the case of DCACHE miss data from memory are transferred to Data Cache (DCACHE) 180 through four channels simultaneously.

The Array Prefetch Buffer (APB) 135 is used to prefetch array elements for loops from memory. The Array Prefetch Buffer (APB) 135 is a four-channel FIFO buffer. The Array Prefetch Buffer (APB) 135 contains 4×48 66-bit registers. Data are transferred from the Array Prefetch Buffer (APB) 135 to the register file (RF) 130 when the data are ready.

The CPU 100 has four memory access channels. Each channel has 64 bits data path.

Figure 2:
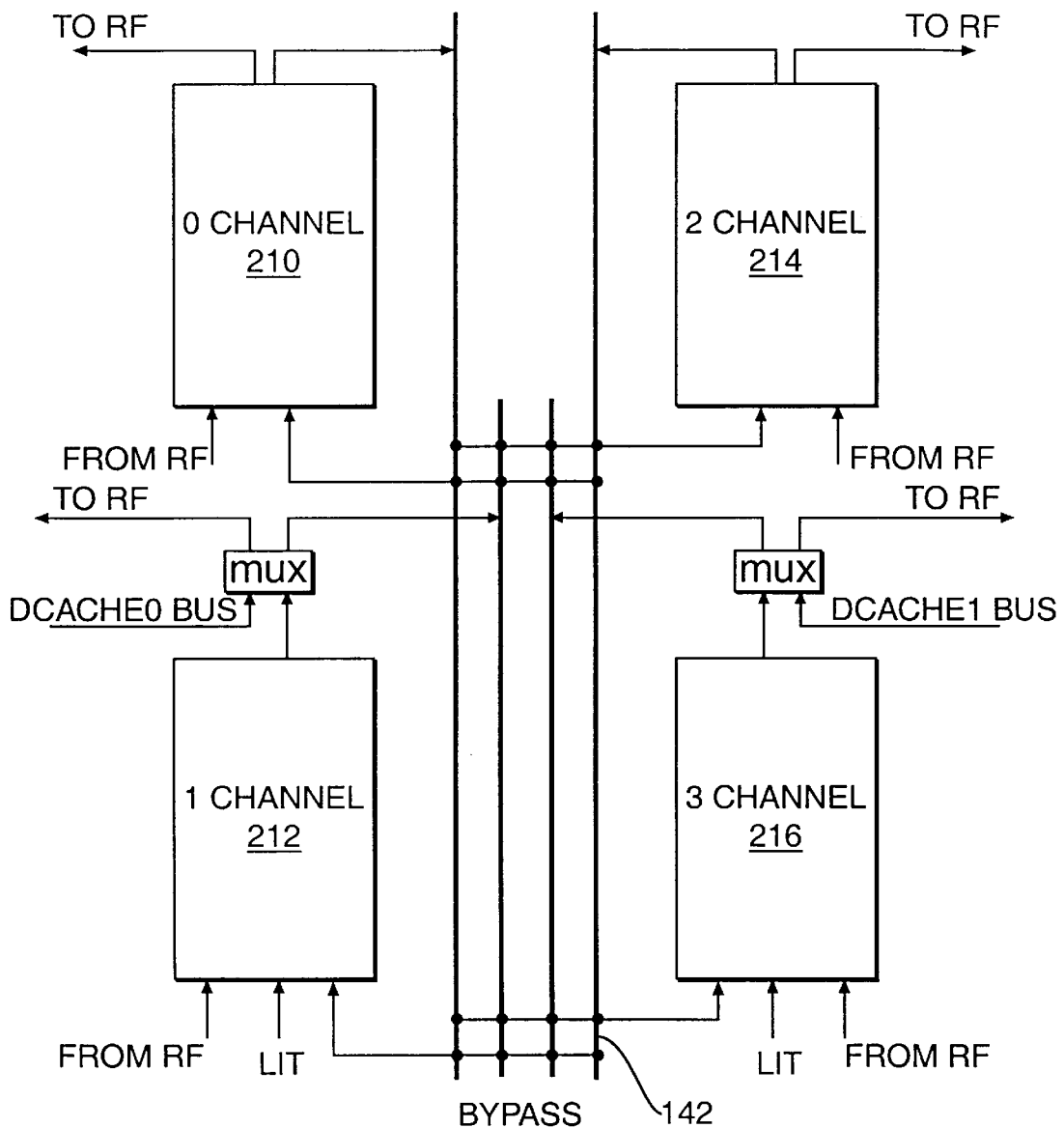
FIG. 2, is a schematic block diagram which illustrates a structure of channel busses of arithmetic and logic channels ALU0, ALU1, ALU2, and ALU3.

Referring to FIG. 2, a schematic block diagram shows a plurality of execution units (EU) integrated into four pipelined arithmetic and logic channels ALU (ALU0 210, ALU1 212, ALU2 214 and ALU3 216). Functions performed by the channels include receiving of operands and generating results, resolving timing conflicts between operations during dynamic execution, and transforming of operands into a form which is suitable for processing in the execution units (EU). Each of the channels ALU0 210, ALU1 212, ALU2 214 and ALU3 216 has individual input and output connections to the register file 130.

ALU0 210, ALU1 212, ALU2 214 and ALU3 216 differ in the set of operations which are executed. The various execution units of all the channels for one embodiment of the CPU 100 are shown in TABLE I with operation execution times indicated in parentheses.

TABLE 1

| ALU0 | ALU1 | ALU2 | ALU3 |
|---|---|---|---|
| DIV(7–11) | MUL(3–4) | MUL(3–4) | MUL(3–4) |
| FPA(3) | FPA(3) | IA(1) | FPA(3) |
| IA(1) | IA(1) | LOG(1) | LOAD(2) |
|  | LOAD(2) | SH(1) | LOG(1) |
|  | COMB(6–8) |  | SH(1) |
|  |  |  | COMB(6–8) |
| 6 | 7 | 3 | 7 |

In TABLE I, IA is an integer addition execution unit (EU), FPA is a floating-point addition EU, DIV is a division EU, MUL is a Multiplication EU, LOG is a logic operations EU, SH is a shift operations EU, LOAD is a memory access operations EU, and COMB is an EU for executing a three-argument combined floating point operation including multiply-add, multiply-multiply, add-add, and add-multiply type operations.

Although operation filling across the four channels ALU0 210, ALU1 212, ALU2 214 and ALU3 216 is highly variable according to the program codes that are executed, the execution units are distributed among the channels ALU0 210, ALU1 212, ALU2 214 and ALU3 216 to best achieve a large degree of filling for typical programs, evenly supply integer and floating point execution units, cover all instruction types, and supply a number of execution units which roughly approximates the proportion of operations performed by a particular type of execution unit.

Write and Read register operations are executed in ALU1 212 and ALU3 216. Literal values in doubleword formats are used in ALU1 212. Literal values in a word format are used in ALU3 216. Memory Synchronization operations are executed in ALU3 216. Combined operations and memory access operations are executed in ALU1 212 and ALU3 216.

All arithmetic and logic channels ALU0 210, ALU1 212, ALU2 214 and ALU3 216 execute operations with single-precision operands (32 bits) and double precision operands (64 bits). ALU0 210 executes operation supporting quad precision computations and double extended precision computations. All operations except divide operations may be started every cycle. A divide is performed, at most, once in two cycles. Combined operations are executed by a sequential start of two execution units or by a sequential start of two operations in the same execution unit. Potential timing conflicts are taken into account by the compiler.

Referring to FIGS. 3A, 3B, 3C, and 3D, a schematic block diagram shows the structure of channels ALU0 210, ALU1 212, ALU2 214 and ALU3 216. The arithmetic and logic channels include three unpack blocks UNPC0 310, UNPC1 312 and UNPC2 314; two input multiplexers MUX_IN0 316 and MUX_IN1 318; three input registers IN_RG0 320, IN_RG1 322, and IN_RG2 324 for, in combination, executing operand packing, unpacking, switching, and reception operations.

The arithmetic and logic channels include three alignment blocks ALIGN0 330, ALIGN1 332, and ALIGN2 334 for executing operand preparation for Fpop operations.

The arithmetic and logic channels perform buffering tasks and distribution of operands and operations using PC and TEM registers PC/TEM RG1 336 and PC/TEM RG2 338, an operation buffer OB 340, four buffers BUF0 342, BUFI 344, BUF2 346, and BUF3 348 for buffering three operands and two operation codes, and five operation buffer multiplexers M_OP0 350, M_OP1 352, M_OP2 354, M_PC/TEM 356, and M_OPC 358. The buffering of tasks and distribution of operands and operations are also accomplished using a plurality of operand multiplexers MUX-O 360, intermediate result registers RG_M 361 and RG_F 362 for assisting combined operations.

The arithmetic and logic channels resolve timing conflicts and generate results using a plurality of result multiplexers MUX-R 364, a plurality of result pipelines RG2, 3, 4, 5, 6, 7, 8 366, a plurality of pipeline control registers C_RG0, 1, 2, 3, 4, 5, 6, 7, 8 368, a pipeline multiplexer control C_IN 370 and an output multiplexer control CTRL_OUT 371, a multiplexer of floating-point units and pipeline and pack block MUX-F/PACK 372, and an output multiplexer MUX_OUT 374.

The arithmetic and logic channels also include execution units DIV 376, FPA 377, IA 378, MUL 379, and LOGSH 380.

FIG. 2 shows channel data buses. The channels ALU0 210, ALU1 212, ALU2 214 and ALU3 216 are connected to each other and to other CPU units by buses including four ALU bypass buses 220, 221, 222 and 223, a cache memory (CACHE) bus 224, a register file bus 226, and a literal constant bus 228. Bypassing using the four ALU bypass buses 220, 221, 222 and 223 allows the CPU 100 to use operation results as operands in the following operations before their write to the register file 130.

Input multiplexers MUX_IN0 316 and MUX_IN1 318 receive operands from seven sources via the input registers IN_RG0 320 and IN_RG1 322 for usage by all execution units of a channel.

Unpack blocks UNPC0 310, UNPC1 312 and UNPC2 314 perform 32-bit operand selection when an operand is read from the register file 130. A double word containing 64-bit data or two 32-bit data words are always read from the register file 130. A first data word is passed unchanged. The position of a second obligatory data word is set by an attribute from the control unit 120. The attribute selects the proper 32 bits of the operand. The 32 selected 32 bits are shifted to the right of the data word.

Alignment blocks ALIGN0 330, ALIGN1 332, and ALIGN2 334 prepare single precision operands for the floating-point EU. The exponent field of a floating-point single precision operand is aligned to the LSB (up to the floating-point double precision exponent field) and the fraction field is aligned to the MSB.

To more effectively use the channels ALU0 210, ALU1 212, ALU2 214 and ALU3 216, a compiler generates a program code so that operations appear at the channel input without taking into account possible output timing conflicts. Hardware resolves these timing conflicts.

The operations have different execution times, so several execution units complete operation execution simultaneously. Timing conflicts of the outputs are resolved dynamically with the aid of additional sequentially connected registers in a pipeline. Results that have not passed to the channel output due to priority are immediately passed to the pipeline. Results are output from a channel according to the following priority. The channel first outputs the result of the first execution unit to begin execution, thus the result of the execution unit having the longest execution time. The result generated by an execution unit having a shorter execution time but which begins later is delayed if the results of the two execution units are ready simultaneous.

Logic blocks including the result pipelines RG2, 3, 4, 5, 6, 7, 8 366, the pipeline control registers C_RG0, 1, 2, 3, 4, 5, 6, 7, 8 368, the pipeline multiplexer control C_IN 370 and an output multiplexer control CTRL_OUT 371 are included in every channel and track the execution unit starting order and, in accordance with the starting order, control pipeline loading, forwarding and delivering of results from the channel. The execution unit to be started and the execution time of this unit are determined by analysis of the OPCODE in C_IN block 370. The EU timing diagram is reflected in the pipeline control registers C_RG0, 1, 2, 3, 4, 5, 6, 7, 8 368. The priority scheme of output multiplexer control CTRL_OUT 371 determines the execution conflict condition and the pipeline levels load order on the basis of pipeline registers busy bits. The number of additional registers necessary to delay the result in each arithmetic logic channel is given in the lower line of TABLE I.

The pack block MUX-F/PACK 372 converts a single precision result into a form suitable for storage by the register file 130. The floating-point EU FPA 377 delivers a single precision result with an exponent which is extended to accommodate double precision data. The floating point result is transformed into single format and shifted right for storage in the register file 130.

CTRL_OUT 371 controls which result is written to the register file 130. Control signals are issued to the register file 130 which represent the number of the pipeline register from which the result is delivered.

The output multiplexer MUX_OUT 374 delivers results to the register file 130, all arithmetic logic channels ALU0 210, ALU1 212, ALU2 214 and ALU3 216, the data cache memory 180, processor registers in the case of register write operations, or the LOAD array address EU during loading of array address channels.

Every execution unit issues exceptions to the control unit 120 directly without passing through any priority logic. The channel accompanies all traps by a PC level number that controls the reading of the corresponding PC from the PC pipeline to the control unit 120.

For execution of instructions by the COMB execution unit three-argument combined operations are implemented in ALU1 212 and ALU3 216. Four types of combined operations are defined including add-add, add-multiply, multiply-add, and multiply-multiply operations. Execution time of a three-argument combined operation is the sum of the number of cycles of the constituent operations. Two operands OP0 and OP1 are used as operands in first level operation, a third operand OP2 and the result of the first level operation are used as operands in second level operation. In addition to particular result timing conflicts, input timing conflicts may arise between the first and second-level operations.

Functional blocks that are prevent the first and second-level timing conflicts during execution of combined operations include the intermediate result registers RG_M 361 and RG_F 362 of the respective FPA and MUL execution units, and buffers BUF0 342, BUF1 344, BUF2 346, and BUF3 348 in which the third operand buffer BUF3 348 holds the third operand and the opcode of the second level operation during the execution of the first level operation. Furthermore the operation buffer OB 340 holds operands and operations that failed to start because MUL or FPA unit is busy with execution of the second level operation. During the execution of the first level operation, OP3 and the opcode of the second level operation is delayed in buffers BUF0 342, BUF1 344, BUF2 346, and BUF3 348. The result of the second level operation is the result of combined operation and is delivered to the register file 130 or bypassed if the second-level result has greater priority than the first level result or the second level result is loaded into the pipeline registers RG6–8 366.

To save additional hardware required to execute 3-argument combined operations, particular with respect to the operation buffer OB 340, some constraints are imposed on the compiler scheduler that are taken into account when starting three-argument combined operations. First, three-argument addition sequences and three-argument multiplication sequences may be started every cycle. One or two-argument operations may be started between the three-argument sequences. Second, three-argument combined operations that occupy the same FPA unit or MUL unit may be started not more often than once in four cycles. Between the three-argument floating point addition and the three-argument floating point multiplication operations any two or one argument operations can be started including operations using the same type of unit. However, a fourth operation cannot use the same type of unit. For example, the following diagram illustrates a suitable sequence of addition stages of a three-argument addition operation in which 1+, 2+ and 3+ respectively represent execution of a first, a second and a third addition stage of a three-argument addition operation. The left column of the diagram illustrates activation of a single three-argument operation (+) or activation of two three-argument operations. The rows illustrate a sequence of clock cycles, starting with a first clock cycle.

```
++:    1+  2+  3+  1+  2+  3+
 +:        1+  2+  3+
 +:            1+  2+  3+
[start is not allowed]
++:                    1+  2+  3+  1+  2+  3+
```

[start is not allowed]
++:1+2+3+1+2+3+

A second example shows that a fourth operation may use a different execution unit, such as a multiplication unit. Here, 1* represents a first multiplication stage of a multiplication operation and, in the left column, * indicates a three-argument multiplication operation.

```
++:    1+  2+  3+  1+  2+  3°
 +:        1+  2+  3+
 +:            1+  2+  3+
 *:                1*
++:                    1+  2+  3+  1+  2+  3+
```

A third rule is that a change from a three-argument multiplication sequence to an addition sequence or from a three-argument addition sequence to an multiplication sequence may be activated on the fourth cycle after the most recent sequence.

The following sequence shows an allowable sequence of three-argument addition and three-argument multiplication operations:

```
+*    1+  2+  3+  1*  2*  3*
+*:       1+  2+  3+  1*  2*  3*
+*:           1+  2+  3+  1*  2*      3*
+*:               1+  2+  3+  1*  2*  3*
+*:                   1+  2+  3+  1*  2*  3*
 +:                       1+  2+  3+
 +:                           1+  2+  3+
 +:                               1+  2+  3+
*+:                                   1*  2*  3*  1+  2+  3+
```

This example illustrates the operation of a fourth rule in which, in a three-argument combined operation, operations having the same symbol are not allowed.

Figure 3A:
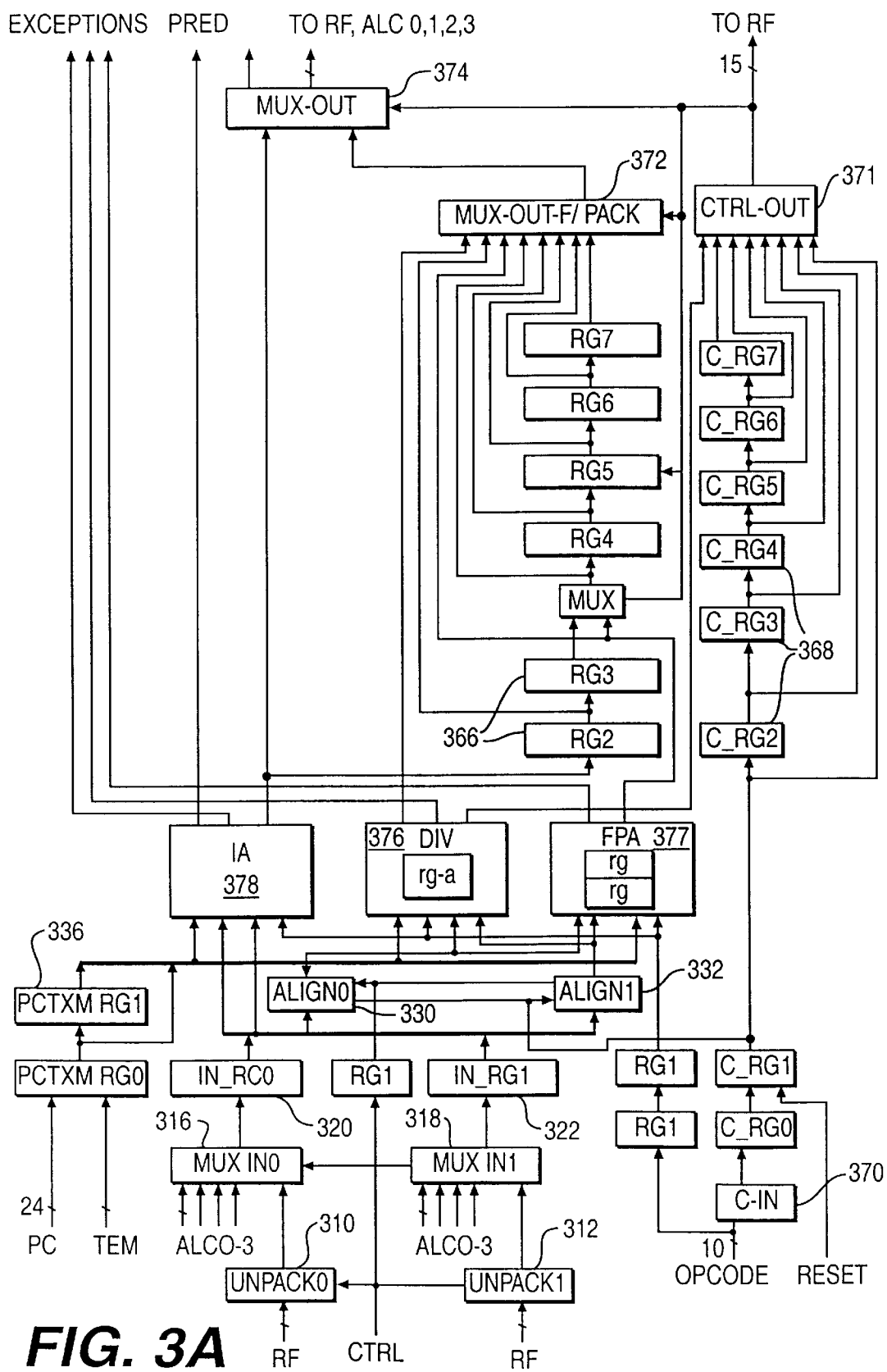
Figure 3C:
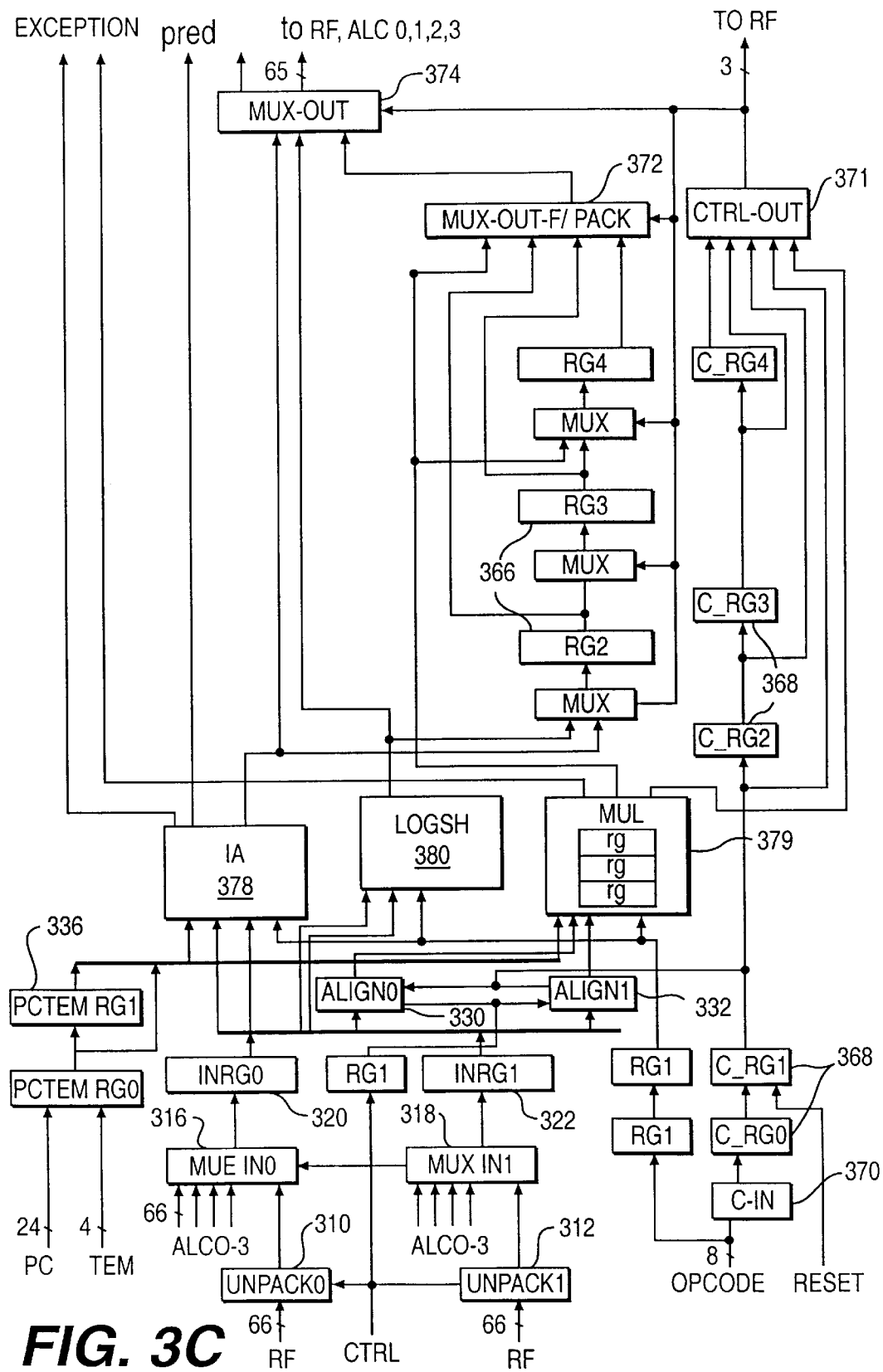

Referring to FIG. 3A, arithmetic logic channel ALU0 210 includes the only division DIV execution unit in the CPU 100. The specific features of ALU0 210 are determined by the division unit. Up to 6 operations with the execution times from 7 to 11 cycles can be present in the division unit at the same time. Results from execution of a division operation are delivered not more often than once in two cycles, so that few additional registers are included to hold division results.

Referring to FIGS. 3B and 3D, arithmetic logic channels ALU1 212 and ALU3 216 include execution units for executing scalar memory read references in addition to arithmetic operations.

Addresses to the data cache 180 are passed through the cache memory (CACHE) bus 224, rather than occupying the register file bus 226 or the four ALU bypass buses 220, 221, 222 and 223 so that execution unit results directed to the register file 130 or the bypass are overlapped with delivery of addresses.

The register file 130 receives data from the arithmetic logic channels ALU0 210, ALU1 212, ALU2 214 and ALU3 216 and from the data cache 180 over a common bus so that results of later-started operations are delayed in the pipeline.

A result from a LOAD operation from the data cache 180 appears in the next cycle. The channels ALU1 212 and ALU3 216 treat the LOAD operation as two-cycle arithmetic operation. The CTRL_OUT 371 block determines the priority of the LOAD operation result. If the result has a lower priority than other data, for example having a lower priority than the result of a previously started MUL unit operation, the result is loaded into the RG3 pipeline register.

In the case of a trap on the LOAD operation, a trap condition message is issued to the data cache 180 to cancel the LOAD request. In a conditional mode, the channel ALU1 212 or ALU3 216 write a defective operand to the register file 130.

The channels ALU1 212 and ALU3 216 execute three-argument combined operations. The maximum execution time of a 3-argument combined operation is up to eight cycles. Therefore, the number of additional registers is increased to seven. Buffering of three-argument operation results complicates pipeline timing.

The arithmetic and logic channels use the result multiplexers MUX-R 364, the result pipelines RG2, 3, 4, 5, 6, 7, 8 366, the pipeline control registers C_RG0, 1, 2, 3, 4, 5, 6, 7, 8 368, and other blocks to resolve timing conflicts. Several timing diagrams are shown which illustrate the resolution of timing conflicts.

Figure 4:
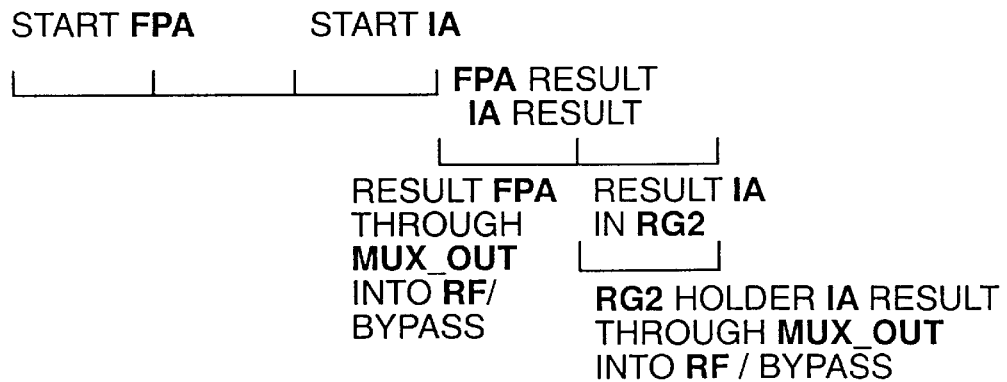
FIG. 4 is a timing diagram which illustrates an example of execution timing arising when an integer operation and a floating point operation are delivered in the same cycle.

Referring to FIG. 4, a timing diagram illustrates an example of execution timing arising when an integer operation and a floating point operation are delivered in the same cycle. A floating point adder execution unit FPA executes an operation and an integer adder execution unit IA executes an operation two cycles later. The IA unit generates a result which is delayed in the RG2 pipeline register because the IA unit is started two cycles later than the FPA execution.

Figure 5:
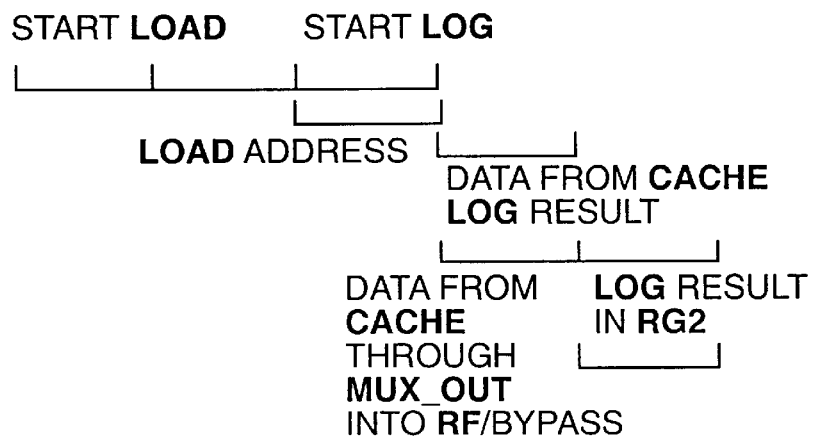
FIG. 5 is a timing diagram which illustrates an example of execution timing occurring when data from a LOAD operation is delivered without delay.

Referring to FIG. 5, a timing diagram illustrates an example of execution timing occurring when data from a LOAD operation from the data cache 180 are delivered to the register file 130 or bypassed without delay.

Figure 6:
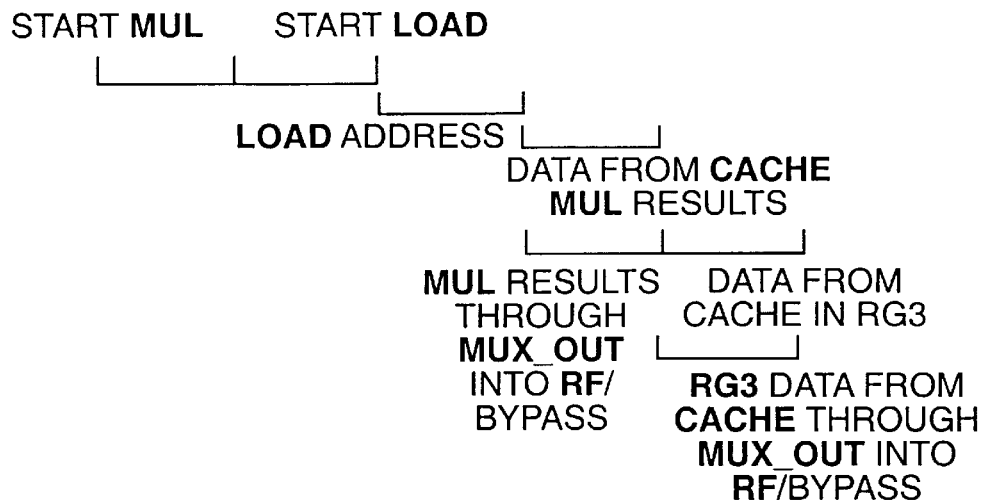
FIG. 6 is a timing diagram which illustrates an example of execution timing occurring when data from a LOAD operation is delayed.

Referring to FIG. 6, a timing diagram illustrates an example of execution timing occurring when data from a LOAD operation is delayed since the LOAD operation from the data cache 180 has a lower priority than the MUL operation. The LOAD result data is delayed by transfer to a pipeline register RG3.

Figure 7:
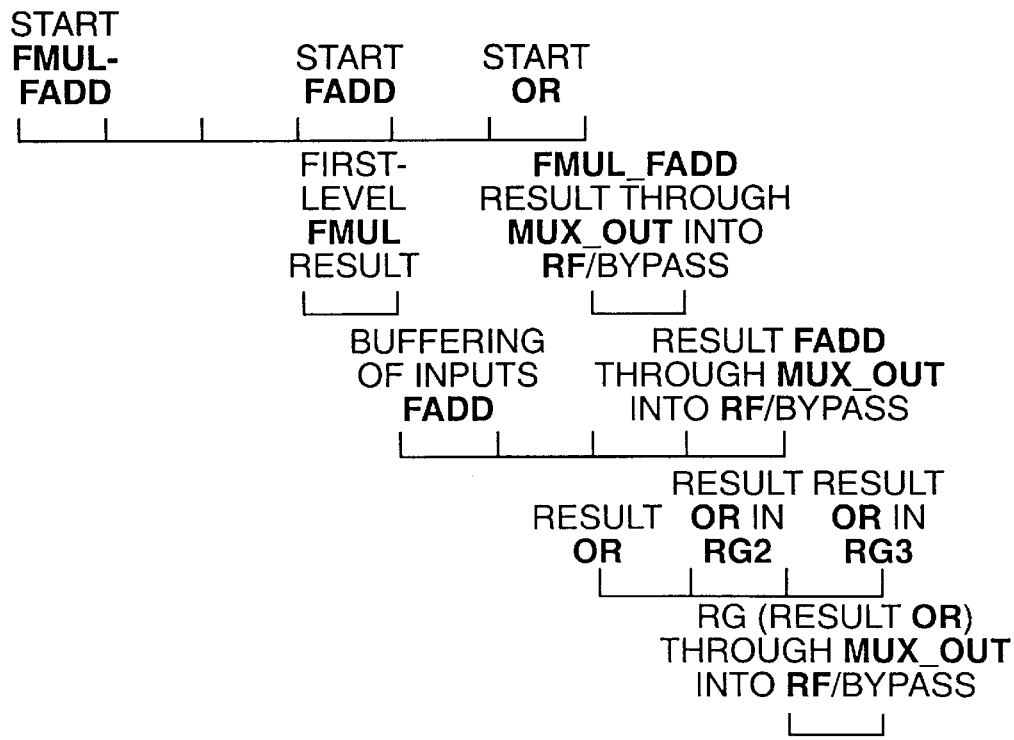
FIG. 7 is a timing diagram which illustrates an example of execution timing occurring for a three-argument combined operation.

Referring to FIG. 7, a timing diagram shows an example of execution timing occurring for a three-argument combined operation including possible timing conflicts. A FADD operation attempts to activate an FPA unit simultaneous with a second level operation of a combined operation. The FADD operation is stored in an opcode buffer while the FPA executes the second level FMUL-FADD operation. An OR operation is also executed and the result of the OR operation is delivered at the same time as the FMUL-FADD result. Because the OR operation began execution later, the OR result is stored in the pipeline register RG2. The FADD operation began execution earlier so the FADD result passes to the ALU output terminal immediately and the OR result is stored in the pipeline register RG3 block and passes to the ALU output terminal.

Figure 8:
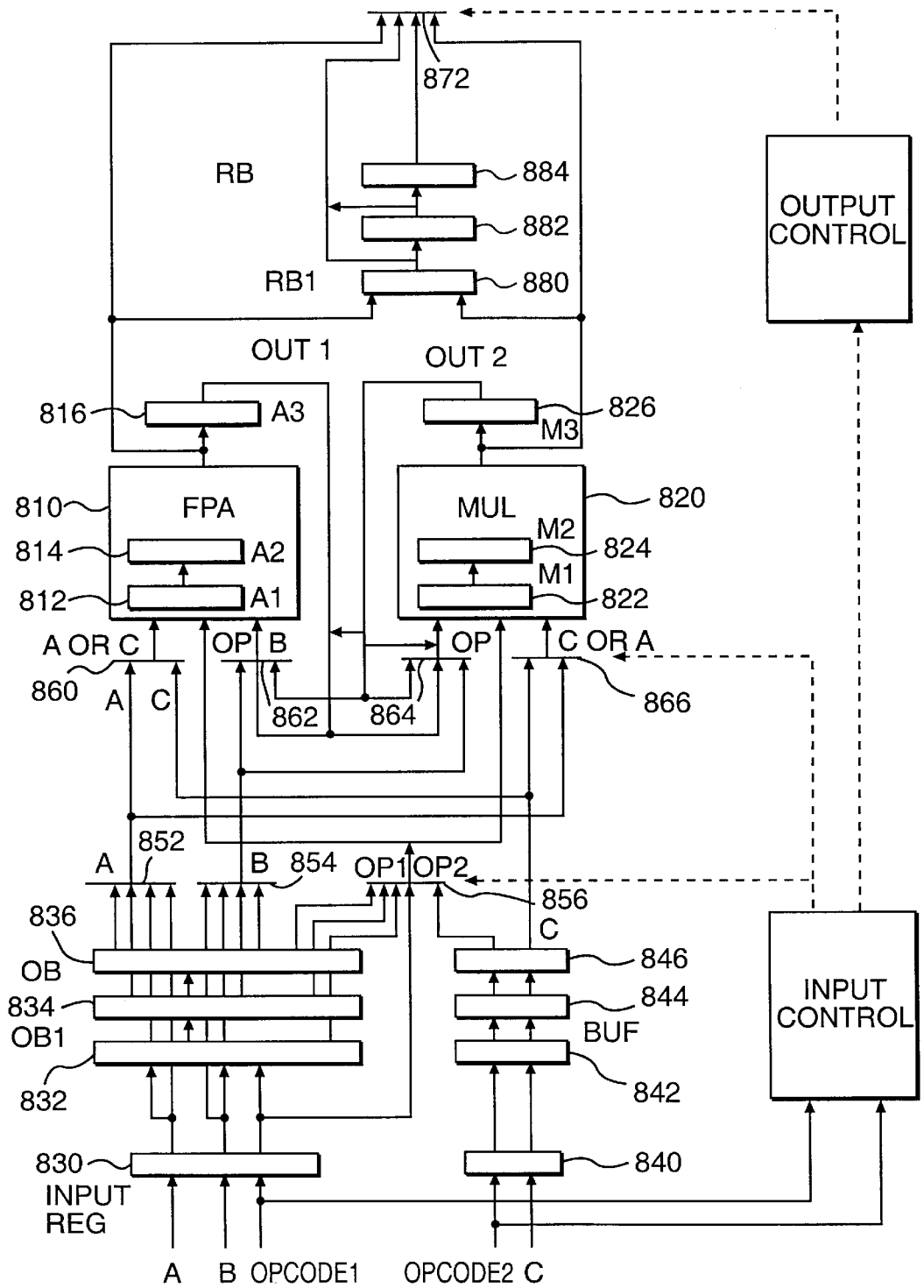
FIG. 8 is a schematic block diagram which illustrates a multiple function execution unit in accordance with an embodiment of the present invention.

Referring to FIG. 8, a schematic block diagram illustrates a multiple function execution unit 800 including buffers and control circuits for selectively activating a floating point adder 810 and a floating point multiplier 820 either individually or in combination. The floating point adder 810 includes two internal floating point registers A1 812 and A2 814 for holding intermediate results and an external floating point register A3 816 for holding a floating point adder output result which is fed back to an input terminal of the floating point adder 810 and also to an input terminal of the floating point multiplier 820. The floating point multiplier 820 includes two internal floating point registers M1 822 and M2 824 for holding intermediate results and an external floating point register M3 826 for holding a floating point multiplier output result which is fed back to an input terminal of the floating point multiplier 820 and also to an input terminal of the floating point adder 810.

The multiple function execution unit 800 includes a first input register 830 and a second input register 840 for receiving operands and operation codes from the data multiplexers 143 and unpack circuits 144 shown in FIG. 1. The first input register 830 receives a first operation code OPCODE1 and A and B operands. The second input register receives a second operation code OPCODE2 and a C operand. Operand data and operation codes are applied from the first input register 830 to a bank of three operand buffers 832, 834 and 836 only for simple (noncombined) operations. For combined operations, operand data and operation codes are applied only from the the first input register 830 to a floating-point adder FPA or to a floating-point multiplier FMUL for first-level operations and from the second register 840 for second-level operations.

The number of buffers for the second operation code and operand C is three, a number determined by the execution time of the first-level operation. Similarly, for simple or noncombined operations executing concurrently with a combined operation, the number of buffers is determined by the execution time of the intructions of the first-level combined operations.

Buffers 832, 834, and 836 store instructions having run collisions, floating-point adder instructions, and floating-point multiplier instructions. Assume that the moment one of these instructions arrives at buffers 832, 834, and 836, and the corresponding execution unit input terminal is occupied by the second-level instruction of an earlier-started combined operation. From one to three instructions may be stored in buffers 832, 834, and 836. If at least one instruction is stored in buffers 832, 834, and 836, a new instruction arriving at the empty buffer is executed in order of arrival to the buffer queue.

The operand data and operation codes are applied from the second input register 840 to a bank of three operand buffers 842, 844 and 846 so that the floating point adder 810 and the floating point multiplier 820 operate on operand data and operation codes that are selected from operand data and operation codes received during multiple clock cycles.

The selection of operands and operation codes from the buffers 832, 834, 836, 842, 844, and 846 and from the input registers 830 and 840 is controlled by an input control circuit 850 which receives operation codes from the unpack circuits 144. The input control circuit 850 controls multiplexers A 852 and B 854 which select one of the A operands and one of the B operands from the buffers 832, 834, 836 and input register 830. The input control circuit 850 also controls multiplexer OP 856 which selects one of the operation codes from the buffers 832, 834, 836 and input register 830. The input control circuit 850 also controls the multiplexer OP 856 to apply a second operation code from the buffers 842, 844, and 846 and from the input register 840. Accordingly, the input control circuit 850 may control the multiplexer OP 856 to apply either one operation code to both the floating point adder 810 and the floating point multiplier 820 or to apply separate operation codes to the floating point adder 810 and the floating point multiplier 820. For the illustrative circuit, when all first-level operations have a duration of three clocks, the operation code 2 and the operand C for the second-level operation is taken only from the buffer 846. At the same time, the input register 840 and buffers 842 and 844 may store the operation code and the operand C of the combined operation which is started subsequently.

The input control circuit 850 controls a B or feedforward multiplexer 862 to select an operand for application to the floating point adder 810 from among the B operand from the multiplexer B 854, the external floating point register A3 816, or the external floating point register M3 826. The input control circuit 850 controls a B or feedforward multiplexer 864 to select an operand for application to the floating point multiplier 820 from among the B operand from the multiplexer B 854, the external floating point register A3 816, or the external floating point register M3 826. The input control circuit 850 also controls a multiplexer A or C 860 to select an operand for application to the floating point adder 810 from between the A operand from the multiplexer A 862 or the C operand from the buffers 842, 844, and 846 and from the input register 840. The input control circuit 850 also controls a multiplexer A or C 866 to select an operand for application to the floating point multiplier 820 from between the A operand from the multiplexer A 862 or the C operand from the buffers 842, 844, and 846 and from the input register 840.

Result data are applied from the floating point adder 810 and the floating point multiplier 820 to a bank of three result buffers 880, 882 and 884 so that result data is output from the multiple function execution unit 800 that are selected from result data generated during multiple clock cycles. An output control circuit 870 receives control information from the input control circuit 850 and controls an output multiplexer 872 to select result data from the result buffers 880, 882 and 884.

Any operation result is applied to the output multiplexer 872 either from the execution unit output terminals or from the three result buffers 880, 882 and 884. The result is placed in the result buffers 880, 882 and 884 if the result is generated simultaneously with the result of an earlier started long instruction.

Figure 9B:
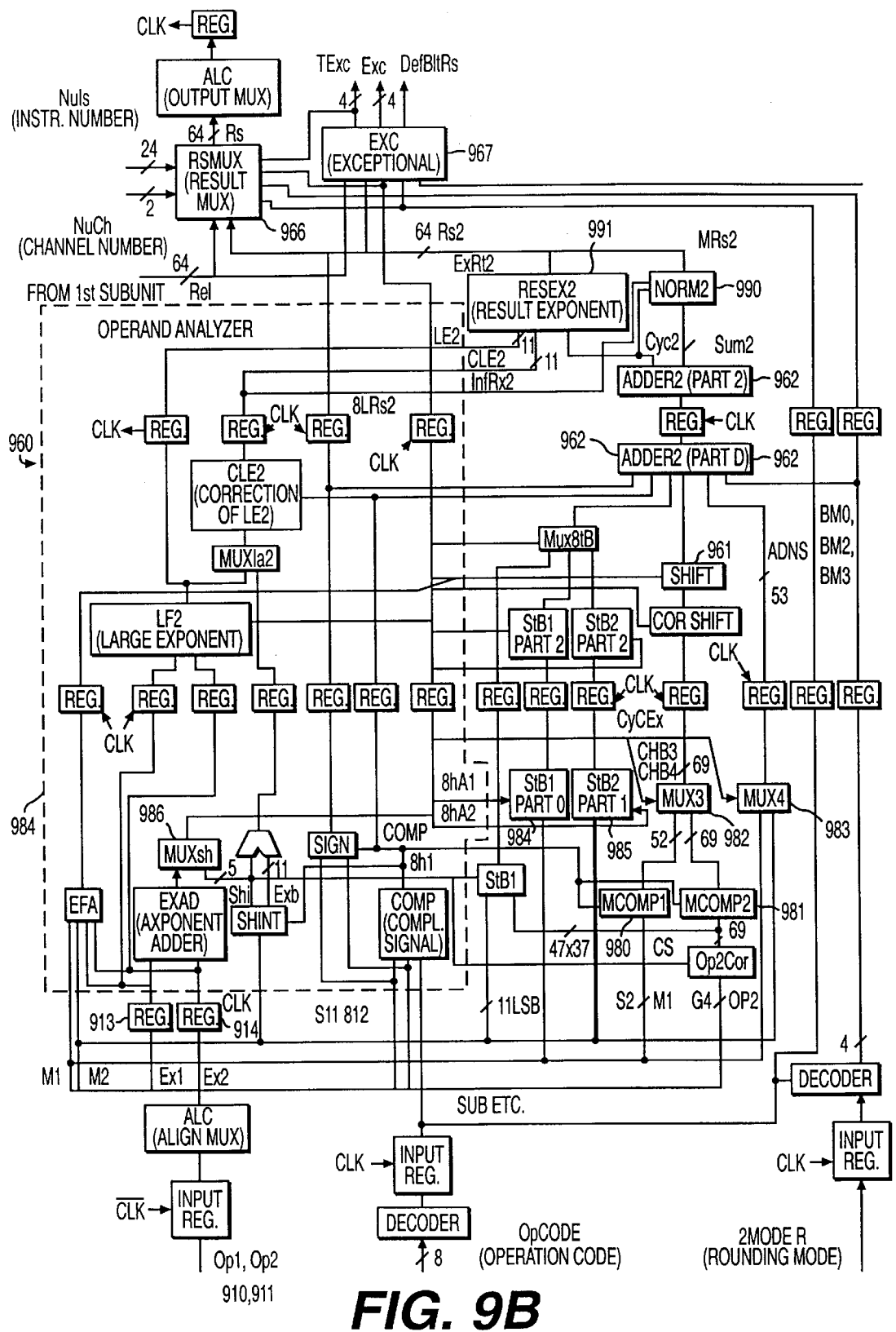

Referring to FIG. 9A and 9B, a schematic block diagram shows a floating point addition unit 900 which implements IEEE standard 754 specifications and supports floating point single (32-bit) and double (64-bit) format operations, high-speed instruction execution, hardware handling of exceptions, and gradual underflow mode. Rounding is overlapped with the addition of operands and is implemented in the same significand adder. The rounding scheme conforms to the IEEE 754 standard. Floating point operation execution time is three cycles in a pipelined mode. The floating-point addition unit supports operations including floating-point addition FADD(s,d), floating-point subtraction FSUB(s,d), floating-point subtraction with reversion of the result sign FSURB(s,d), conversion between floating-point formats FsTOd, FdTOs, conversion of floating-point formats to integer formats F(s,d)TO(i,x), and conversion of integer formats to floating-point formats F(i,x)TO(s,d). In the designated instruction codes, d refers to double format, s refers to a single format for floating point numbers, x means double format and i refers to a single format for integer numbers.

The floating point addition unit 900 is connected to 64-bit operand buses A 910 and B 911 and a 64-bit result bus 912. Single format operands are shifted at input registers A 913 and B 914 so that the operand exponents are aligned according to the least significant exponent bit of a double-size operand and operand fractions are aligned according to the most significant bit of the double-size operand fraction.

In conventional units implementing the IEEE 754 standard, rounding is carried out after the addition of significands in the additional incrementor "IEEE round". In the illustrative unit, rounding is overlapped with addition of operands and is implemented in the same significand adder, thereby accelerating instruction execution and reducing the circuit size.

The floating point addition unit 900 includes a first subunit 920 and a second subunit 960. The floating point addition unit 900 is divided into two subunits because of the character of operations in two special cases. The first subunit 920 implements two operations including: (1) a subtraction operation while the exponent difference (ED) is equal to zero, and (2) a subtraction operation when the exponent difference is equal to one and the result is not normalized. When the exponent difference (ED) is equal to 0 or 1, a right shift by one bit of the significand for the exponent alignment is implemented as a multiplexer 921. However, since a normalization of more than one bit is possible, a left sum shifter 922 which includes more than one level of multiplexers, is used after the significand adder. The first subunit does not round the result. To accelerate shifting for normalization, rounding is produced during subtraction of the significands.

The second subunit 960 implements three operations including: (1) addition, (2) a subtraction operation when the exponent difference is equal to one and the result is not normalized, and (3) a subtraction operation when the exponent difference is greater than one. When the exponent difference ED>1, a shifter 961 is used to shift the significand right to accommodate exponent alignment. A significand adder 962 is used to add significands. The result of the significand addition is left normalized by one bit in the case of a subtraction operation, and right shifted by one bit in the case of an overflow condition as controlled by a multiplexer 963. In this manner, the second subunit 960 rounds the result.

The floating point addition unit 900 functions in the following manner. First, the operand types are determined and control and data signals are generated based on analysis of the data exponents and fractions using a first operand analyzer 924 in the first subunit 920 and a second operand analyzer 964 in the second subunit 960. The control and data signals are applied to computation circuits in the first and second subunits 920 and 960 including significand adders and exponent adders and normalization circuits which are described specifically hereinafter. Results generated by the computation circuits are selected by a first result multiplexer RSMUX 926 in the first subunit 920 and a second result multiplexer RSMUX 966 in the second subunit 960.

Exception signals INVALID, OVERFLOW, UNDERFLOW, INEXACT are generated and delivered from a first EXC block 927 and a second EXC block 967, respectively for the first and second subunits 920 and 960, simultaneously with the result in conformance to IEEE 754 and SPARC-V9. Signals Exc are generated without masking by a trap enable mask TEMfpa. Signals TExc are masked by the trap enable mask TEMfpa and used for transferring control to a handler of trapped result.

In the first subunit 920 shown in FIG. 9A, operand significands are shifted right only by one digit when exponent alignment takes place or are complemented through the operation of multiplexers MUX1 928 and MUX2 929. During handling of the data by multiplexers MUX1 928 and MUX2 929, the exponent difference of the data operands is not yet known so that identity of the operand data having the largest size is determined conditionally on the basis of the difference of the two least significant digits of the operand exponents. The final choice of the result is made in first result multiplexer RSMUX 926 because by this moment the accurate exponent difference is determined.

Following multiplexing by multiplexers MUX1 928 and MUX2 929, significands are added or subtracted by the first significand adder ADDER1 922. The subtraction operation is performed using a one's complement addition. The result of addition is normalized in the NORM1 shifter 930. Addition is enabled in the first subunit 920 only when a conversion instruction is taking place. The shift amount ShN for normalization is delivered from a leading zero anticipator (LZA) circuit 931 during delivery of the sum by the first significand adder ADDER1 922. The shift number ShN value is based on analysis of summands, but ShN is limited to a largest possible shift amount ShNm. If ShN is greater than ShNm, the final shift amount for normalization becomes equal to ShNm, and the result becomes denormalized. The limitation on ShN prevents the result exponent, which is generated by an exponent correct adder block ECA1 932 from falling below Emin-1.

The result sign SiRs1 is generated only after the first significand adder ADDER1 922 has formed a sum because if the exponents are equal, the sign is not known until the cyclic carry operation of the adder is complete. When operand exponents are not equal, the previously prepared SiRs1_a from the operand analyzer 964 is the result sign.

In the second subunit 960 shown in FIG. 9B, the significands of both operands are complemented by complement blocks MCOMP1 980 and MCOMP2 981 and applied to a multiplexer MUX3 982. The multiplexer MUX3 982 selects the operand with a smaller exponent for additional shifting. A multiplexer MUX4 983 selects the operand with a larger exponent for passage to the significand adder ADDER2 962 without shifting. Thus the second subunit 960, like the first subunit 920, only allows the subtraction of operands with unequal exponents. The complementation of the lesser operand both makes complementation of the sum generated by ADDER2 962 unnecessary and simplifies the rounding of the result. The shifter 961 shifts the operand significand with the smaller exponent to the right a shift amount equal to ShA. When the complementation takes place, the complementation signal replaces significand positions which are vacated due to shifting.

Through the analysis of the significand bits which are shifted out of significand field other than the two most significant shifted out bits, sticky bit StB is generated in sticky bit blocks StB1 984 and StB2 985, and a sticky bit multiplexer MuxStB 986. The two most significant shifted-out bits are called guard bits and are generated in the shifter 961. The sticky bit StB is delivered only when at least one of the shifted-out bits of the shifted operand is equal to 1. To accelerate the generation of StB, the significands analysis includes two sticky bit blocks StB1 987 and StB2 988, each of which assumes a mutually exclusive contradictory condition of the relative operand size. In particular, the sticky bit block StB1 987 assumes that the first operand has the smaller exponent. The sticky bit block StB2 988 assumes that the second operand has the smaller exponent. The shift amounts of the low-order digits of ShA1, ShA2, which are generated in accordance with the assumptions and used in sticky bit blocks StB1 987 and StB2 988 respectively, are generated faster than the true shift amount ShA. Thus the delivery of the common sticky bit StB is accelerated. The sticky bit multiplexer MuxStB 989 selects the sticky bit StB1 or StB2 which corresponds to the correct assumption.

The significand adder ADDER2 962 generates a result which is rounded in accordance with a rounding mode signal ModeR. Rounding and addition occur concurrently. A NORM2 multiplexer 990 selects a result from the significand adder ADDER2 962 which is shifted one bit left or shifted one bit right, depending on whether an overflow condition occurred or the normalization is performed.

A multiplexer RESEX2 991 selects a result exponent from between previously prepared largest exponent LE2 or a modified exponent version CLE2 which corrects LE2 in case of overflow or normalization. The selected exponent value is determined according to two most significand sum bits which indicate whether an overflow condition or normalization has occurred.

The result sign of the second subunit 960 is generated prior to the addition operation in the operand analyzer 964. The result multiplexer RSMUX 966 selects a result of the subunits.

Figure 10:
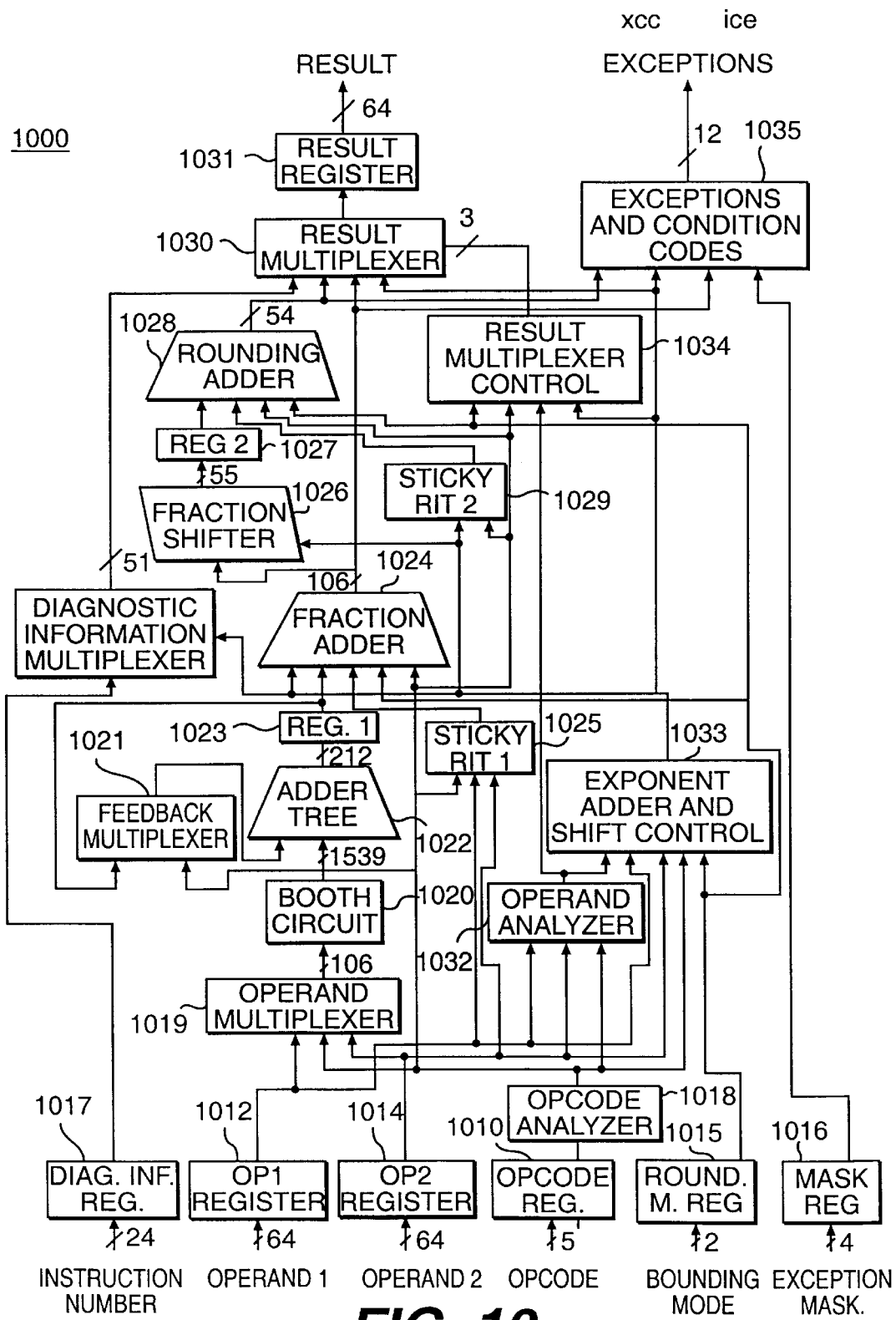
FIG. 10 illustrates a schematic block diagram of a floating point multiplier for usage in the ALU channels shown in FIGS. 3A through 3D.

Referring to FIG. 10, a schematic block diagram shows a floating point multiplier 1000 which performs integer and floating-point multiplication operations. The floating point multiplier 1000 executes integer and floating-points operations using the same circuits. The multiplication unit 1000 supports a gradual underflow mode and operations with denormalized operands, generation of sticky bits for the fraction adder and for the rounding adder on the basis of the analysis of operands, and simultaneous addition of two partial product vectors and the rounding of the result fraction. The floating-point operation execution time of the multiplication unit 1000 is increased when the result denormalization or normalization of more than one bit is necessary.

The multiplication unit 1000 executes operations including a single-word floating point multiply FMULs, a double-word floating-point multiply FMULd, a single-word to double-word floating-point multiply FsMULd, a single-word integer multiply MULs, a double-word integer multiply MULd, an unsigned 32 to 64-bit unsigned integer multiply UMUL, a signed integer multiply 32 to 64 bits SMUL.

Signed integer operations use operands in a twos complement form. Floating-point operations correspond to the IEEE 754 floating-point binary arithmetic standard.

The multiplication unit 1000 executes operations in three or four clock cycles including cycles for transferring data between the channel and sources and destinations. Operations which are executed in four cycles include the FMULs and FMULd operations when one of the operands is denormalized and the other is normalized, FMULs and FMULd operations with two normalized operands which cause underflow or conditional underflow of the result, the FsMULd operation when one of its operands is denormalized and the other is either normalized or denormalized, an integer double format multiply operation if operand OP1 has more than 53 significant bits or operand OP2 has more than 47 significant bits, and any multiply operation if a multiply operation run in the previous cycle is a four-cycle multiply operation.

The flow processing rate of the multiplication unit 1000 is one operation in one clock cycle except the MULd operation when operand OP1 has more than 53 significant bits or operand OP2 has more than 47 significant bits. In these cases, the cycle that follows the MULd operation should not be a multiply operation.

The multiplication unit 1000 implements a modified 53×53 bits Booth's algorithm with addition of partial products carried out in the Wallace tree. The operation MULd having an operand OP1 with more than 53 significant bits or an operand OP2 with more than 47 significant bits is executed during two iterations. Other operations are executed during one iteration.

The multiplication unit 1000 includes an opcode register 1010 which accepts four opcode bits and multiply operation valid bit, and two 64-bit operands 1012 and 1014 which accept a multiplicand and a multiplier. Integer single format operands applied to the operand registers 1012 and 1014 are shifted to the right. Floating-point single format operands are shifted to the left and arrive in an unpacked form. For 32-bit operands, three zero-bits are inserted between the sign bit and the MSB of the exponent. For the operation MULd which is executed in two iterations, the operand registers are blocked during one cycle and operands remain in the operand registers during two cycles.

The rounding mode register 1015 accepts a two-bit code of the rounding mode for floating-point operations. The rounding mode codes specify rounding to the nearest number (binary 00), toward zero (binary 01), toward plus infinity (binary 10), and toward minus infinity (binary 11).

The mask register 1016 accepts a 4-bit code of the mask of exceptions for floating-point operations. Register bits (from the MSB to the LSB) mask the following exceptions: invalid operand (INV), overflow (OVF), underflow (UNF), and inexact result (INEX). The diagnostic information register 1017 accepts the number of instruction (24 lower bits) that serves as the diagnostic information. The opcode analyzer 1018 is connected to the opcode register 1010 and functions to decode the opcode and generate control signals. The operands multiplexer 1019 selects an appropriate multiplicand and the multiplier parts and generates a corrective summands for the integer multiply operations.

The Booth circuit 1020 decodes the multiplier fraction and generates partial products according to a modified Booth algorithm. For the integer multiply operations in each iteration the corrective summands arrive to the partial product bits known to be 0, and for the operation MULd, executed during two iterations, two partial product vectors of the first iteration result from the feedback multiplexer 1021 output arrive instead of two least significant partial products in the second iteration.

The adder tree 1022 is a Wallace tree on which the carry save addition of partial products is executed. Two partial product vectors of the full product of operand fractions are obtained at the output. The Booth circuit 1020 and adder tree 1022 provide the multiplication of floating-point double format numbers during one iteration. The integer operation MULd, having an operand OP1 with more than 53 significant bits or an operand OP2 with more than 47 significant bits, is executed during two iterations.

The feedback multiplexer 1021 transforms two partial product vectors of a first iteration result to be added to the partial products of the second iteration for the operation MULd, executed during two iterations.

A first intermediate register REG1 1023 accepting two partial product vectors of the product fraction from the adder tree 1022 and generates intermediate results of a product exponent computation and control signals.

A fraction adder 1024 performs carry look ahead addition of two partial product vectors of the full product. The fraction adder 1024 also performs rounding for floating-point operations executed in three clock cycles and generates the inexact result signal for three-cycle floating-point operations.

A sticky bit 1 logic 1025 generates a sticky bit for the fraction adder 1024 on the basis of the analysis of floating-point operand fractions. The sticky bit 1 logic 1025 sums the least significant zero bits of both operands, compares the sum to the number of the LSB of the product fraction (for single or double format result), and generates the sticky bit.

A fraction shifter 1026 receives data from the fraction adder 1024, shifts the full product fraction left (normalization) or right (denormalization) for floating-point operations. The maximum right shift is 52 bits. The maximum left shift is 105 bits.

A second intermediate register REG2 1027 receives the full product fraction from the fraction shifter 1026 and generates a result exponent and control signals.

A rounding adder 1028 rounds the shifted fraction of the full product for floating-point operations executed in four clock cycles.

A sticky bit 2 logic 1029 generates a sticky bit for the rounding adder 1028 on the basis of the analysis of the floating-point operand fractions and of the shift value in the fraction shifter 1026. The numbers of the least significant zero bits of both operands are summed, an amount of the product fraction shift right is subtracted from this sum, or amount of the product shift left is added. The resulting value is compared with the number of the LSB of the product fraction (for single or double format result), from which the sticky bit is generated.

A result multiplexer 1030 selects a result fraction from one of three sources including the fraction adder 1024, the rounding adder 1028 or the diagnostic information register 1017. One-bit result normalization is carried out if necessary. An exponent, corresponding to the chosen direction and execution of one-bit normalization, is selected.

A result register 1031 holds the result data.

An operands analyzer 1032 is connected to the opcode register 1010 and the two 64-bit operand registers 1012 and 1014. The operands analyzer 1032 analyzes a floating-point operand type (normalized, denormalized, zero, infinity) and calculates a number of the most significant fraction zeroes.

An exponent adder and shift control circuit 1033 is connected to the opcode register 1010, the two 64-bit operand registers 1012 and 1014, and the operands analyzer 1032. The exponent adder and shift control circuit 1033 adds operand exponents allowing for the possible product fraction shift and generates overflow and underflow signals. The exponent adder and shift control circuit 1033 generates code of shift amount for the fraction shifter 1026.

A result multiplexer control circuit 1034 generates result multiplexer control code on the basis of the opcode, the rounding mode, types of the operands and of the result, overflow and underflow signals.

An exceptions and condition codes circuit 1035 generates condition codes xcc and icc for integer operations UMUL and SMUL and exception code for floating-point operations. The xcc and icc bits are: xcc.N is equal to 63rd bit of the result, xcc.Z is set to 1 when 63–0 bits of the result are zeroes, icc.N is equal to the three first bits of the result and icc.Z is set to 1 when 31–0 bits of the result are zeroes. The exception code bits are (from the MSB to the LSB): invalid operation (INV), overflow (OVF), underflow (UNF) and inexact result (INEX). The exceptions correspond to the IEEE 754 floating-point binary arithmetic standard.

A diagnostic information multiplexer 1036 selects the diagnostic information, specifically the instruction number, that corresponds to the operation just having completed execution.

While the invention has been described with reference to various embodiments, it will be understood that these embodiments are illustrative and that the scope of the invention is not limited to them. Many variations, modifications, additions and improvements of the embodiments described are possible.

What is claimed is:

1. A computer system comprising:
an execution unit including:
an adder having a first input terminal for receiving a first input operand, a second input terminal for receiving a second input operand and an output terminal for generating a sum;
a multiplier having a first input terminal for receiving a first input operand, a second input terminal for receiving a second input operand, and an output terminal for generating a product, the multiplier being operationally independent of the adder; and
a control circuit coupled to the adder and the multiplier, the control circuit generating signals for selectively controlling the adder to execute operations independently of the multiplier and to alternatively execute a single operation in combination between the adder and the multiplier;
a first input register coupled to a first operand bus, a second operand bus, and a first opcode bus;
a second input register coupled to a third operand bus and a second opcode bus; and
a plurality of multiplexers coupled between:
the first and second input registers, and
the adder and the multiplier, and
coupled to receive a control signal from the control circuit.

2. A computer system according to claim 1 wherein the execution unit further comprises:
a first result buffer coupled to the output terminal of the adder and coupled to the output terminal of the multiplier, and having an output terminal.

3. A computer system according to claim 2 wherein the execution unit further comprises:
a second result buffer having an input terminal coupled to the output terminal of the first result buffer, and having an output terminal;
a third result buffer having an input terminal coupled to the output terminal of the second result buffer, and having an output terminal; and
a multiplexer coupled to the output terminal of the adder, the output terminal of the multiplier, the output terminal of the first result buffer, the output terminal of the second result buffer, and the output terminal of the third result buffer, the multiplexer having a control terminal coupled to the control circuit.

4. A computer system according to claim 1, wherein the control circuit controls the operation of the execution unit to execute a plurality of combined operations including a mul-add operation, a mul-mul operation, an add-mul operation, and an add-add operation.

5. A computer system according to claim 4, wherein the control circuit further controls the operation of the execution unit to execute a plurality of simple operations including a mul operation, and an add operation.

6. A computer system according to claim 1 wherein the multiplexer is controlled by the control circuit to selectively couple operands from the first operand bus, the second operand bus, the third operand bus, the first opcode bus and the second opcode bus among the adder and the multiplier.

7. A computer system according to claim 1 wherein:
the output terminal of the adder is coupled to a terminal selected between the first and second input terminals of the adder via a multiplexer of the plurality of multiplexers and is coupled to a terminal selected between the first and second input terminals of the multiplier via a multiplexer of the plurality of multiplexers; and the output terminal of the multiplier is coupled to a terminal selected between the first and second input terminals of the adder via a multiplexer of the plurality of multiplexers and is coupled to a terminal selected between the first and second input terminals of the multiplier via a multiplexer of the plurality of multiplexers.

8. A computer system according to claim 1 wherein the execution unit further comprises:
a plurality of operand buffers coupled between:
the first and second input registers; and
the plurality of multiplexers.

9. A computer system according to claim 2 wherein the execution unit further comprises:
an adder output register having an input terminal coupled to the output terminal of the adder and having an output terminal coupled to an input terminal of the first and second input terminals of the adder and the first and second input terminals of the multiplier; and
a multiplier output register having an input terminal coupled to the output terminal of the multiplier and having an output terminal coupled to an input terminal of the first and second input terminals of the adder and the first and second input terminals of the multiplier.

10. A computer system according to claim 1 wherein the execution unit is an execution unit of a very long instruction word processor.

11. A computer system according to claim 1, further comprising:
a plurality of execution units, the plurality of execution units and the execution unit combining in an arithmetic logic unit;
a register file coupled to the arithmetic logic unit;
a memory coupled to the arithmetic logic unit and the register file; and
a control unit coupled to the arithmetic logic unit for controlling the plurality of execution units.

12. A computer system according to claim 1, wherein the execution unit is a floating point execution unit, the adder is a floating point adder, and the multiplier is a floating point multiplier.

13. A method of providing a computer system comprising the steps of: providing a computer system, the provided computer system including: an execution unit further including:
an adder having a first input terminal for receiving a first input operand, a second input terminal for receiving a second input operand, and an output terminal for generating a sum;
a multiplier having a first input terminal for receiving a first input operand, a second input terminal for receiving a second input operand, and an output terminal for generating a product, the multiplier being operationally independent of the adder;
a control circuit coupled to the adder and the multiplier, the control circuit generating signals for selectively controlling the adder to execute operations independently of the multiplier and to alternatively execute a single operation in combination between the adder and the multiplier;
a first input register coupled to a first operand bus, a second operand bus, and a first opcode bus;
a second input register coupled to a third operand bus and a second opcode bus; and
a plurality of multiplexers coupled between:

the first and second input registers, and
the adder and the multiplier, and
coupled to receive a control signal from the control circuit.

14. a method according to claim 13 wherein the execution unit further comprises:
a first result buffer coupled to the output terminal of the adder and coupled to the output terminal of the multiplier, and having an output terminal.

15. A method according to claim 14 wherein the execution unit further comprises;
a second result buffer having an input terminal coupled to the output terminal of the first result buffer, and having an output terminal;
a third result buffer having an input terminal coupled to the output terminal of the second result buffer, and having an output terminal; and
a multiplexer coupled to the output terminal of the adder, the output terminal of the multiplier, the output terminal of the first result buffer, the output terminal of the second result buffer, and the output terminal of the third result buffer, the multiplexer having a control terminal coupled to the control circuit.

16. A method according to claim 13, further comprising the step of providing a computer system wherein the execution unit is a floating point execution unit, the adder is a floating point adder, and the multiplier is a floating point multiplier.

17. A method according to claim 13 further comprising the steps of:
providing a plurality of execution units, the plurality of execution units and the execution unit combining in an arithmetic logic unit;
providing a register file coupled to the arithmetic logic unit;
providing a memory coupled to the arithmetic logic unit and the register file; and
providing a control unit coupled to the arithmetic logic unit for controlling the plurality of execution units.

18. A method according to claim 13 wherein the execution unit further comprises:
an adder output register having an input terminal coupled to the output terminal of the adder and having an output terminal coupled to an input terminal of the first and second input terminals of the adder and the first and second input terminals of the multiplier; and
a multiplier output register having an input terminal coupled to the output terminal of the multiplier and having an output terminal coupled to an input terminal of the first and second input terminals of the adder and the first and second input terminals of the multiplier.

19. A method of operating an execution unit of a computer system comprising the steps of:
selecting an operation from among a combined add-multiply operation, a combined add-add operation, a combined multiply-add operation; and a combined multiply-multiply operation'
applying a first operand, a second operand, and a first opcode to a computation unit selected from an adder computation unit and a multiplier computation unit on the basis of the selected operation, the computation unit generating a result;
applying the result, a third operand, and a second opcode to a computation unit selected from the adder computation unit and the multiplier computation unit on the basis of the selected operation, the computation unit generating a result;
coupling a first input register to a first operand bus, a second operand bus, and a first opcode bus;
coupling a second input register to a third operand bus and a second opcode bus; and
coupling a plurality of multiplexers between:
the first and second input registers, and
the adder and the multiplier, said multiplexers receiving a control signal from the control circuit.

20. A method according to claim 19 further comprising the steps of:
executing a plurality of operations concurrently with the selected operation; and
buffering input operands of an operation to avoid a timing conflict.

21. A method according to claim 19 further comprising the steps of:
executing a plurality of operations concurrently with the selected operation; and
buffering a result of an operation to avoid a timing conflict.

22. A method according to claim 19, wherein the execution unit is a floating point execution unit, the adder computation unit is a floating point adder, and the multiplier computation unit is a floating point multiplier.

* * * * *